US012608875B2

(12) United States Patent
Cao et al.

(10) Patent No.: US 12,608,875 B2
(45) Date of Patent: Apr. 21, 2026

(54) PICTURE GENERATION METHOD AND APPARATUS, DEVICE, AND MEDIUM

(71) Applicant: Tencent Technology (Shenzhen) Company Limited, Shenzhen (CN)

(72) Inventors: Wensheng Cao, Shenzhen (CN); Wei Cao, Shenzhen (CN); Tangxi Chen, Shenzhen (CN); Xiaojie Wang, Shenzhen (CN); Lijun Yuan, Shenzhen (CN); Chong Zhang, Shenzhen (CN); Meng Zhai, Shenzhen (CN); Xingyuan Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 226 days.

(21) Appl. No.: 18/198,172

(22) Filed: May 16, 2023

(65) Prior Publication Data

US 2023/0290043 A1 Sep. 14, 2023

Related U.S. Application Data

(63) Continuation of application No. PCT/CN2022/118921, filed on Sep. 15, 2022.

(30) Foreign Application Priority Data

Oct. 25, 2021 (CN) .......................... 202111240819.1

(51) Int. Cl.
*G06T 15/20* (2011.01)
*G06T 15/50* (2011.01)
(52) U.S. Cl.
CPC ............ *G06T 15/20* (2013.01); *G06T 15/503* (2013.01)

(58) Field of Classification Search
CPC ....... G06T 15/20; G06T 15/503; A63F 13/52; A63F 13/53; A63F 13/355; A63F 13/35; A63F 2300/538; A63F 2300/66
See application file for complete search history.

(56) References Cited

U.S. PATENT DOCUMENTS 6,496,198 B1 * 12/2002 Wang ..................... G06T 11/60
382/284
2006/0215931 A1 * 9/2006 Shimomukai ...... H04N 1/32251
382/284
(Continued)

FOREIGN PATENT DOCUMENTS

CN 107223270 A 9/2017
CN 108876926 A 11/2018
(Continued)

OTHER PUBLICATIONS

Sadzak, A., et al. "Information perception in virtual heritage storytelling using animated and real avatars." Spring Conference on Computer Graphics. Apr. 28, 2007. https://people.etf.unsa.ba/~asadzak/sccg/sccg07.htm) (Year: 2007).*
(Continued)

*Primary Examiner* — Xiao M Wu
*Assistant Examiner* — Latrell Anthony Creary
(74) *Attorney, Agent, or Firm* — Morgan, Lewis & Bockius LLP

(57) ABSTRACT

Disclosed are a picture generation method performed by a computer device. The method includes: rendering a three-dimensional virtual scene to obtain a scene background rendering map; rendering a first foreground target reported by a first terminal associated with a first client to obtain a first foreground target rendering map; blending the scene background rendering map and the first foreground target rendering map to obtain a first picture, the first picture including the first foreground target displayed in the three- (Continued)

dimensional virtual scene; and providing the first picture to the first terminal associated with the first client for displaying the first picture. A technology of thousand people with thousand faces is achieved, the rendering efficiency can be improved, and the cost is saved.

20 Claims, 17 Drawing Sheets

(56)                  References Cited

U.S. PATENT DOCUMENTS

| | | | |
|---|---|---|---|
| 2012/0038637 A1 | 2/2012 | Marks | |
| 2021/0176288 A1* | 6/2021 | Ahuja | H04L 67/08 |
| 2022/0124286 A1* | 4/2022 | Punwani | H04L 65/1069 |

FOREIGN PATENT DOCUMENTS

| | | | |
|---|---|---|---|
| CN | 111275611 | A | 6/2020 |
| CN | 111402374 | A | 7/2020 |
| CN | 112652046 | A | 4/2021 |
| CN | 113426112 | A | 9/2021 |
| CN | 113457143 | A | 10/2021 |
| CN | 113941147 | A | 1/2022 |
| WO | WO 2015123775 | A1 | 8/2015 |
| WO | WO 2018045927 | A1 | 3/2018 |
| WO | WO 2021112882 | A1 | 6/2021 |

OTHER PUBLICATIONS

Tencent Technology, WO, PCT/CN2022/118921, Dec. 9, 2022, 4 pgs.
Tencent Technology, ISR, PCT/CN2022/118921, Dec. 9, 2022, 3 pgs.

* cited by examiner

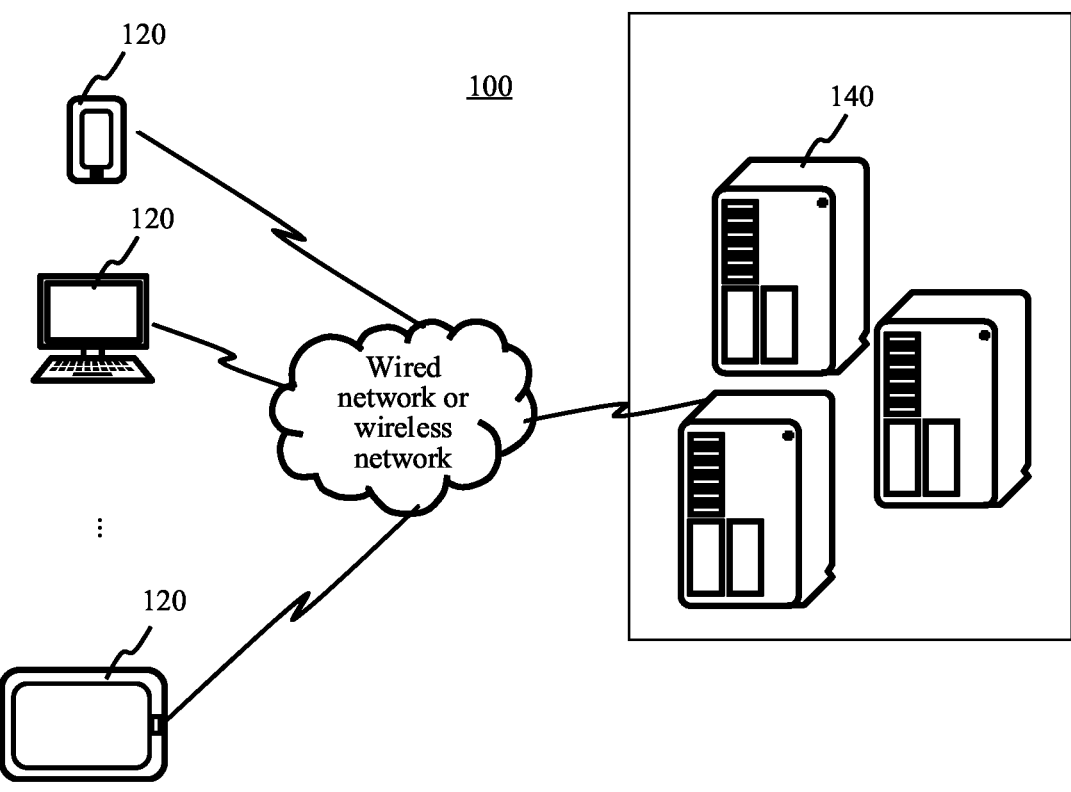

120

120

100

140

Wired network or wireless network

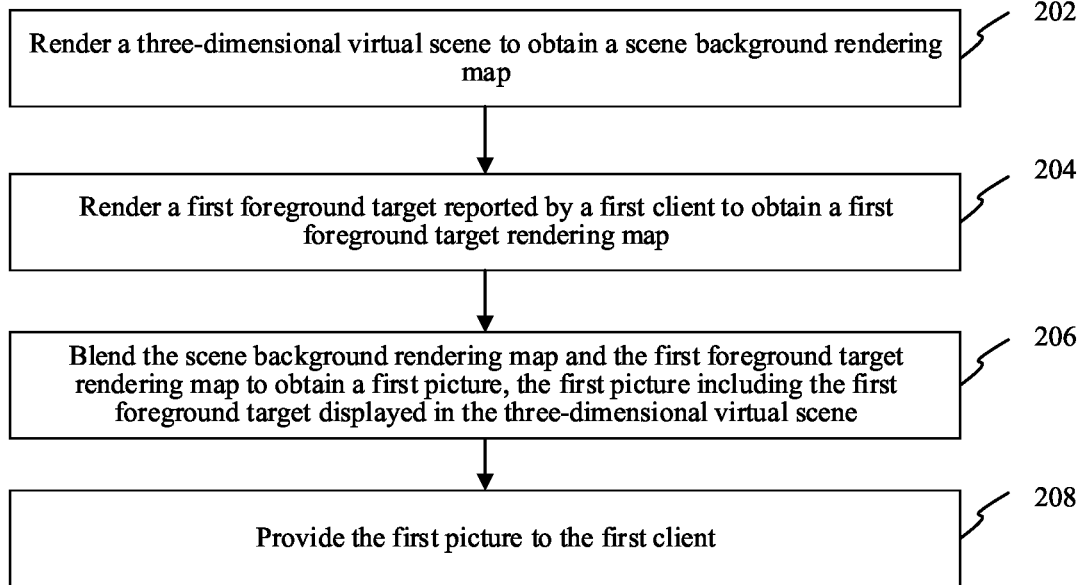

Render a three-dimensional virtual scene to obtain a scene background rendering map

202

Render a first foreground target reported by a first client to obtain a first foreground target rendering map

204

Blend the scene background rendering map and the first foreground target rendering map to obtain a first picture, the first picture including the first foreground target displayed in the three-dimensional virtual scene

206

Provide the first picture to the first client

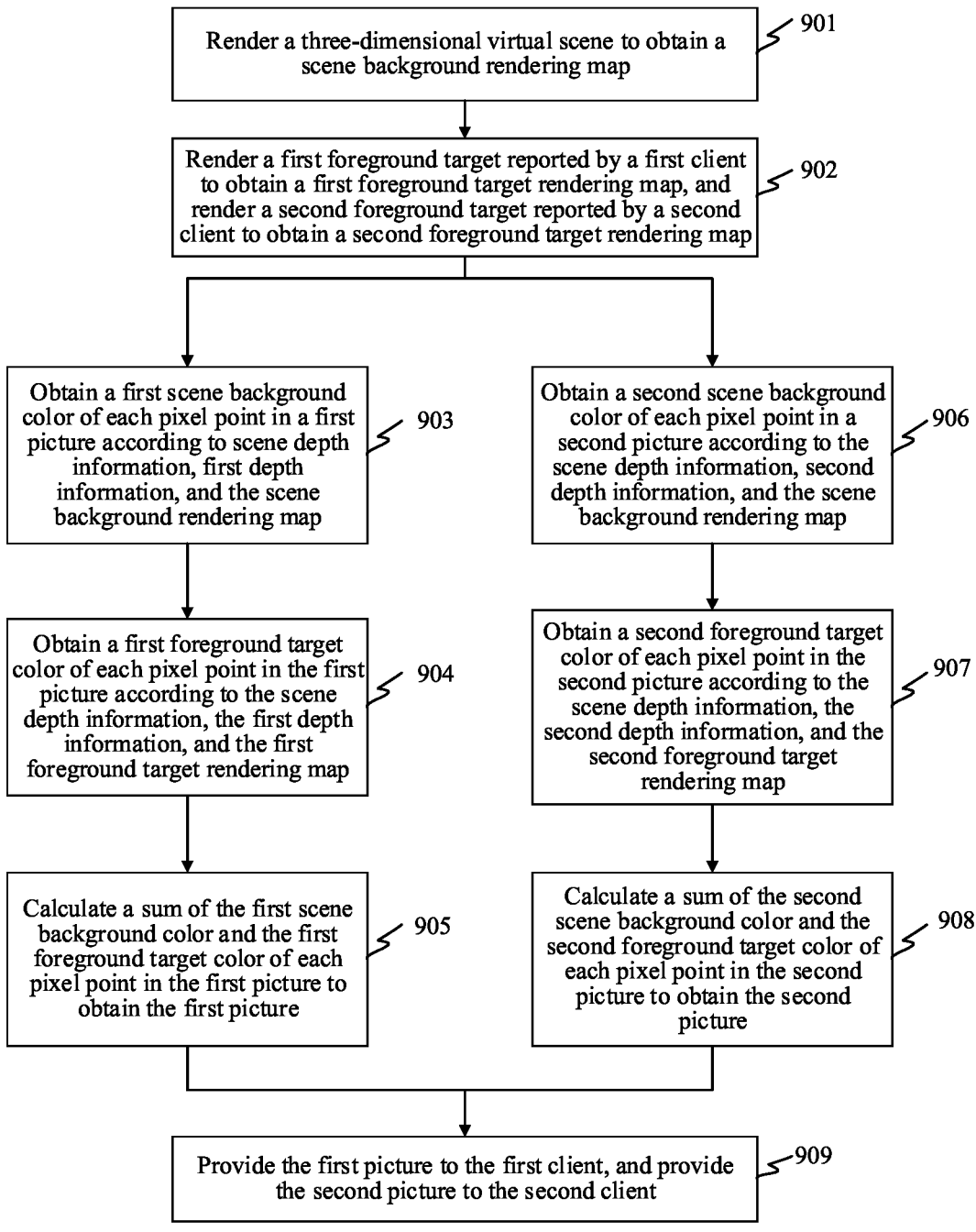

Render a three-dimensional virtual scene to obtain a scene background rendering map ⟋901

Render a first foreground target reported by a first client to obtain a first foreground target rendering map, and render a second foreground target reported by a second client to obtain a second foreground target rendering map ⟋902

Obtain a first scene background color of each pixel point in a first picture according to scene depth information, first depth information, and the scene background rendering map ⟋903

Obtain a second scene background color of each pixel point in a second picture according to the scene depth information, second depth information, and the scene background rendering map ⟋906

Obtain a first foreground target color of each pixel point in the first picture according to the scene depth information, the first depth information, and the first foreground target rendering map ⟋904

Obtain a second foreground target color of each pixel point in the second picture according to the scene depth information, the second depth information, and the second foreground target rendering map ⟋907

Calculate a sum of the first scene background color and the first foreground target color of each pixel point in the first picture to obtain the first picture ⟋905

Calculate a sum of the second scene background color and the second foreground target color of each pixel point in the second picture to obtain the second picture ⟋908

Provide the first picture to the first client, and provide the second picture to the second client ⟋909

PICTURE GENERATION METHOD AND APPARATUS, DEVICE, AND MEDIUM

CROSS-REFERENCE TO RELATED APPLICATIONS

This application is a continuation application of PCT Patent Application No. PCT/CN2022/118921, entitled "PICTURE GENERATION METHOD AND APPARATUS, DEVICE, AND MEDIUM" filed on Sep. 15, 2022, which claims priority to Chinese Patent Application No. 202111240819.1, filed with the State Intellectual Property Office of the People's Republic of China on Oct. 25, 2021, and entitled "PICTURE GENERATION METHOD AND APPARATUS, DEVICE, AND MEDIUM", all of which are incorporated herein by reference in their entirety.

FIELD OF THE TECHNOLOGY

This application relates to the field of image processing, and in particular, to a picture generation method and apparatus, a device, and a medium.

BACKGROUND OF THE DISCLOSURE

Cloud games refer to games based on cloud computing. A server runs the games and transmits rendered game pictures to a client, and the client is mainly responsible for displaying the game pictures.

In a motion sensing cloud game, a camera is required to acquire a user image in the related art. The client transmits the user image to the server. After receiving the user image, the server processes the user image to generate a corresponding user model. Then the server places the user model into a three-dimensional virtual environment, renders the user model and the three-dimensional virtual environment as a whole to obtain a game picture, and transmits the game picture to the client. The client displays the game picture.

However, when cloud games played by multiple clients use the same three-dimensional virtual environment, the game picture of each client is obtained by rendering the user model and the three-dimensional virtual environment as a whole via the server. Therefore, the server repeatedly renders the three-dimensional virtual environment for the game pictures of the multiple clients, whereby the rendering efficiency of the server is low.

SUMMARY

Embodiments of this application provide a picture generation method and apparatus, a device, and a medium. The method only needs to render a three-dimensional virtual environment once, whereby the rendering efficiency is high, and the cost is saved. The technical solutions are described as follows.

According to one aspect of this application, a picture generation method is provided. The method is applied to a server. The method includes:

rendering a three-dimensional virtual scene to obtain a scene background rendering map;

rendering a first foreground target reported by a first terminal associated with a first client to obtain a first foreground target rendering map;

blending the scene background rendering map and the first foreground target rendering map to obtain a first picture, the first picture including the first foreground target displayed in the three-dimensional virtual scene; and providing the first picture to the first terminal associated with the first client for displaying the first picture.

According to another aspect of this application, an interaction method is provided. The method is applied to at least two clients. The method includes:

acquiring, by a first client, a first foreground target via a first camera; acquiring, by a second client, a second foreground target via a second camera;

displaying, by the first client, a first picture of a three-dimensional virtual scene, the first picture including the first foreground target displayed in the three-dimensional virtual scene; and displaying, by the second client, a second picture of the three-dimensional virtual scene, the second picture including the second foreground target displayed in the three-dimensional virtual scene, foreground targets in the first picture and the second picture being different, scene backgrounds in the first picture and the second picture being a same scene background, and the first foreground target and the second foreground target moving in a same three-dimensional virtual scene.

According to another aspect of this application, an interaction system is provided. The system includes at least two interaction apparatuses. The system is configured to:

acquire, by a first interaction apparatus, a first foreground target via a first camera; acquire, by a second interaction apparatus, a second foreground target via a second camera;

display, by the first interaction apparatus, a first picture of a three-dimensional virtual scene, the first picture including the first foreground target displayed in the three-dimensional virtual scene; and display, by the second interaction apparatus, a second picture of the three-dimensional virtual scene, the second picture including the second foreground target displayed in the three-dimensional virtual scene, foreground targets in the first picture and the second picture being different, scene backgrounds in the first picture and the second picture being a same scene background, and the first foreground target and the second foreground target moving in a same three-dimensional virtual scene.

According to another aspect of this application, a computer device is provided. The computer device includes: a processor and a memory. The memory stores at least one instruction, at least one program, a code set, or an instruction set. The at least one instruction, the at least one program, the code set, or the instruction set is loaded and executed by the processor and causes the computer device to implement the picture generation method in the above aspect or the above interaction method.

According to another aspect of this application, a non-transitory computer-readable storage medium is provided. The computer-readable storage medium stores at least one program code. The program code is loaded and executed by a processor of a computer device and causes the computer device to implement the picture generation method in the above aspect or the above interaction method.

According to another aspect of this application, a computer program product or a computer program is provided. The computer program product or the computer program includes computer instructions. The computer instructions are stored in a non-transitory computer-readable storage medium. A processor of a computer device reads the computer instructions from the computer-readable storage medium. The processor executes the computer instructions, whereby the computer device performs the picture generation method provided in the above aspect or the above interaction method.

At least the following beneficial effects are brought about by the technical solution provided in the embodiments of this application.

During picture generation, a three-dimensional virtual scene needs to be rendered only once to obtain a scene background rendering map, and then the scene background rendering map is blended with a first foreground target rendering map to obtain a picture. Since the whole process only renders the three-dimensional virtual scene once, not only a technology of thousand people with thousand faces is achieved, but also the number of renderings is reduced, whereby the performance consumption is smaller, the bearing limit is higher, the rendering efficiency is higher, and the cost is saved.

In addition, in this application, the process of rendering a first picture is decoupled into: rendering a three-dimensional virtual scene and a first foreground target respectively, and then blending the three-dimensional virtual scene and the first foreground target, whereby the three-dimensional virtual scene and the first foreground target are independent of each other and support being blended with each other, the same three-dimensional virtual scene may be adapted to multiple foreground targets, and vice versa.

BRIEF DESCRIPTION OF THE DRAWINGS

FIG. 1 is a structural block diagram of a computer system according to an exemplary embodiment of this application.

FIG. 2 is a schematic flowchart of a picture generation method according to an exemplary embodiment of this application.

FIG. 9 is a schematic flowchart of a picture generation method according to an exemplary embodiment of this application.

DESCRIPTION OF EMBODIMENTS

Figure 3:
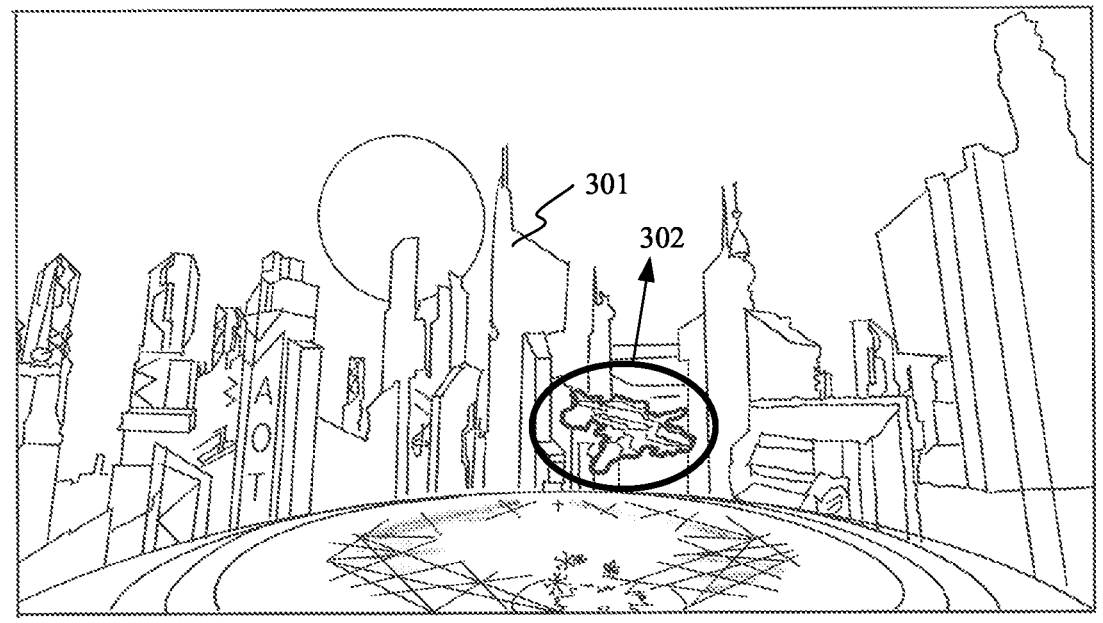
FIG. 3 is a schematic diagram of a three-dimensional virtual environment according to an exemplary embodiment of this application.

First, the nouns involved in the embodiments of this application are described:

Three-dimensional Virtual Scene: The three-dimensional virtual scene is a virtual world composed of models, maps, and other resources and used in program development.

Depth: The depth is used for representing a distance between an object and a camera. A longer distance corresponds to a larger depth.

Rendering: Rendering is a process of processing the three-dimensional virtual scene into a computer device picture using program code logic in conjunction with a game engine, a central processing unit (CPU), and a graphics card.

Cloud Game: The game logic is run on a server side, and a user can experience a high-quality game on a low-configuration device by only having the most basic cloud game client and only receiving a video stream and transmitting user input data.

Technology of Thousand People with Thousand Faces: The technology refers to that pictures displayed on multiple clients connected to a server have the same background scene and different foreground targets. For example, a first client and a second client are connected to the same server. A first picture is displayed on the first client. The first picture includes a scene background: forest and a foreground target: avatar of user A. A second picture is displayed on the second client. The second picture includes a scene background: forest and a foreground target: avatar of user B.

Game Engine: The game engine refers to a core component of some well-written editable computer game systems or some interactive real-time image applications. These systems provide a technician with a variety of tools required to write a game with the goal of allowing the technician to easily and quickly make a game program.

UV (U: Horizontal Direction, V: Vertical Direction): UV is also referred to as UV coordinates representing a plane in which all images are two-dimensional. With the planar and two-dimensional UV coordinate system, any pixel in the picture may be positioned.

Texture: In this application, the texture refers to a two-dimensional image in the game engine.

FIG. 1 shows a schematic structural diagram of a computer system according to an exemplary embodiment of this application. The computer system 100 includes: a terminal 120 and a server 140.

The terminal 120 includes at least one terminal. A client related to a three-dimensional virtual scene is run on the terminal 120. The client may be an applet in an application (APP), or a specialized APP, or a web client. Illustratively, a cloud game related to the three-dimensional virtual scene is run on the terminal 120. After the terminal 120 receives a game picture transmitted by the server, the terminal 120 displays the game picture. The terminal 120 is at least one of a smartphone, a tablet computer, a smart TV, a vehicle-mounted terminal, a wearable device, an e-book reader, an MP3 player, an MP4 player, a laptop portable computer, and a desktop computer. The terminal 120 is provided with a camera, or the terminal 120 is connected to the camera.

The terminal 120 is connected to the server 140 through a wireless network or a wired network.

The server 140 may be an independent physical server, a server cluster or a distributed system composed of a plurality of physical servers, or a cloud server providing basic cloud computing services, such as a cloud service, a cloud database, cloud computing, a cloud function, cloud storage, a network service, cloud communication, a middleware service, a domain name service, a security service, a content delivery network (CDN), and big data and artificial intelligence platforms. The server 140 is configured to provide a background service for the client supporting the three-dimensional virtual scene, and transmits a picture to the terminal 120. In some embodiments, the server 140 undertakes primary computing tasks, and the terminal 120 undertakes secondary computing tasks.

FIG. 2 shows a schematic flowchart of a picture generation method according to an embodiment of this application. The method is applied to a server. The method may be applied to the server 140 shown in FIG. 1. The method includes the following steps:

Step 202: Render a three-dimensional virtual scene to obtain a scene background rendering map.

The three-dimensional virtual scene may be set by a technician or a user. In some embodiments, the three-dimensional virtual scene is a virtual scene displayed in one frame of image of video stream data. In some embodiments, the three-dimensional virtual scene is changed or remains unchanged as the server continuously renders the video stream data.

Illustratively, the server continuously renders a game picture of a motion sensing cloud game and continuously transmits the game picture to a client. For example, the three-dimensional virtual scene of a motion sensing cloud game is constantly changed during the progress of the motion sensing cloud game. For example, as a player steps in place, the game picture changes a virtual scene of "corridor" in which the player is located, so as to realize movement of the player in the cloud game. In the movement scene, the server will continuously render the three-dimensional virtual scene.

Illustratively, the server continuously renders a picture of a cloud conference and continuously transmits the game picture to the client. For example, during a cloud conference, a conference site of the cloud conference will be constantly changed. For example, when a reporter introduces a development progress of place A, the conference site is switched to place A. When the reporter introduces a development potential of place B, the conference site is switched to place B. In the conference scene, the server will continuously render the three-dimensional virtual scene.

Rendering refers to the process of processing a three-dimensional virtual scene into a scene background rendering map via the server. In this application, the server only needs to generate multiple pictures in conjunction with multiple foreground targets reported by multiple clients according to the scene background rendering map obtained by one rendering. The scene background rendering map is a two-dimensional image obtained by rendering the three-dimensional virtual scene. Illustratively, as shown in FIG. 3, a three-dimensional virtual scene 301 is rendered to obtain a scene background rendering map.

Step 204: Render a first foreground target reported by a first terminal associated with a first client to obtain a first foreground target rendering map.

The first client refers to a client connected to the server. After the first client reports a first foreground target to be rendered, the server renders the first foreground target as the first foreground target rendering map. In one embodiment, a use object of the first client is the first foreground target. At this moment, the use object of the first client will be in the three-dimensional virtual scene. In one embodiment, a virtual figure corresponding to the use object of the first client is the first foreground target. At this moment, the virtual figure corresponding to the use object of the first client will be in the three-dimensional virtual scene.

Figure 4:
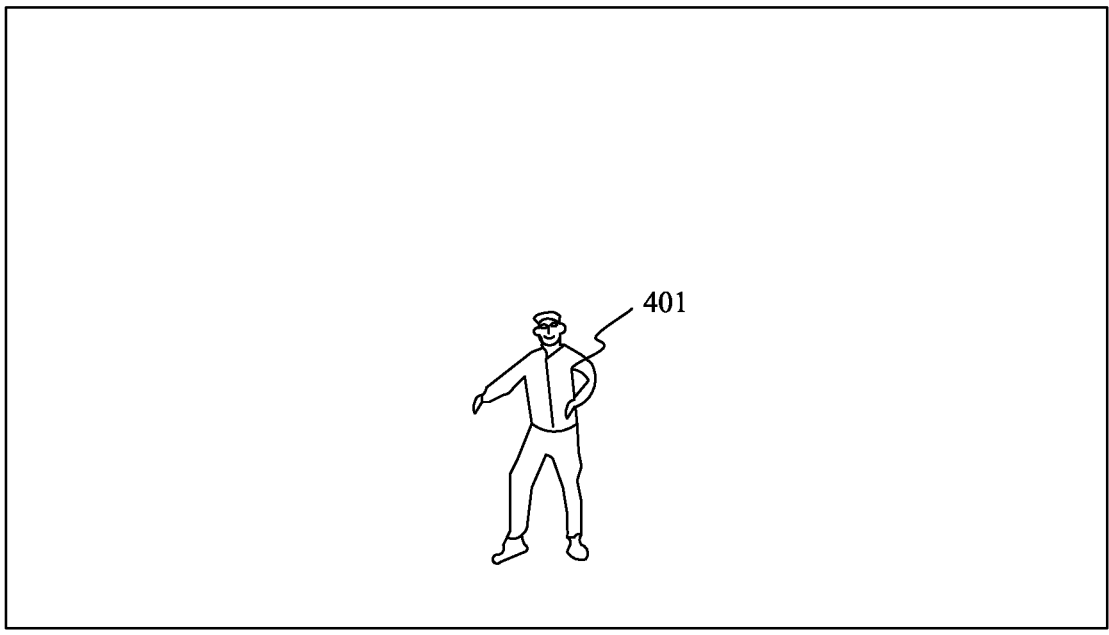
FIG. 4 is a schematic diagram of a first foreground target according to an exemplary embodiment of this application.

The first foreground target rendering map is a two-dimensional image obtained by rendering the first foreground target. Illustratively, as shown in FIG. 4, a first foreground target 401 is rendered to obtain a first foreground target rendering map.

Rendering refers to the process of processing a first foreground target into a first foreground target rendering map via the server. In this application, after the server renders the first foreground target rendering map, a first picture to be displayed on the first client is further generated in conjunction with the scene background rendering map.

In some embodiments, the first foreground target is obtained by a first camera. The first camera is a camera on a terminal where the first client is located, or the first camera is a camera connected to the terminal where the first client is located. In some embodiments, the first foreground target is a foreground target displayed in one frame of image of video stream data. In some embodiments, the first foreground target is dynamically changed as the server continuously renders the video stream data.

Illustratively, the server continuously renders a game picture of a motion sensing cloud game and continuously transmits the game picture to the first client. In some embodiments, the first camera continuously obtains the first foreground target during the playing of the motion sensing cloud game, whereby the first foreground target on the game picture is dynamically changed. For example, a player on the game picture will swing a tennis racket as the player is waving.

Illustratively, the server continuously renders a picture of a cloud conference and continuously transmits the game picture to the first client. In some embodiments, the first camera continuously obtains the first foreground target during the playing of the cloud conference, whereby the first foreground target on the cloud conference picture is dynamically changed. For example, a reporter on the conference picture will wave arms as the conference reporter is waving.

In an implementation of this application, the first foreground target is a user avatar. In some embodiments, when multiple user avatars are acquired by the first camera, each of the multiple user avatars is taken as the first foreground target, or a user avatar closest to the first camera among the multiple user avatars is taken as the first foreground target, or a user avatar located in a specified region is taken as the first foreground target, or a first target user avatar among the multiple user avatars is taken as the first foreground target. The first target user avatar is a user avatar recognized by a face.

In an implementation of this application, the first foreground target is a user body image. In some embodiments, when multiple user body images are acquired by the first camera, each of the multiple user body images is taken as the first foreground target, or a user body image closest to the first camera among the multiple user body images is taken as the first foreground target, or a user body image located in a specified region is taken as the first foreground target, or a first target user body image among the multiple user body images is taken as the first foreground target. The first target user body image is a user body image obtained by action matching.

Step 206: Blend the scene background rendering map and the first foreground target rendering map to obtain a first picture, the first picture including the first foreground target displayed in the three-dimensional virtual scene.

In this embodiment of this application, the first picture is a picture rendered according to a front-back hierarchical relationship between the three-dimensional virtual scene and the foreground target. In some embodiments, a front-back hierarchical relationship between the three-dimensional virtual scene and the foreground target is determined according to scene depth information of the three-dimensional virtual scene and depth information of the foreground target. In some embodiments, the scene background rendering map and the first foreground target rendering map are blended according to scene depth information and first depth information of the three-dimensional virtual scene to obtain a first picture. The first depth information is depth information of the first foreground target. The scene background rendering map and a second foreground target rendering map are blended according to the scene depth information and second depth information to obtain a second picture. The second depth information is depth information of a second foreground target.

Figure 6:
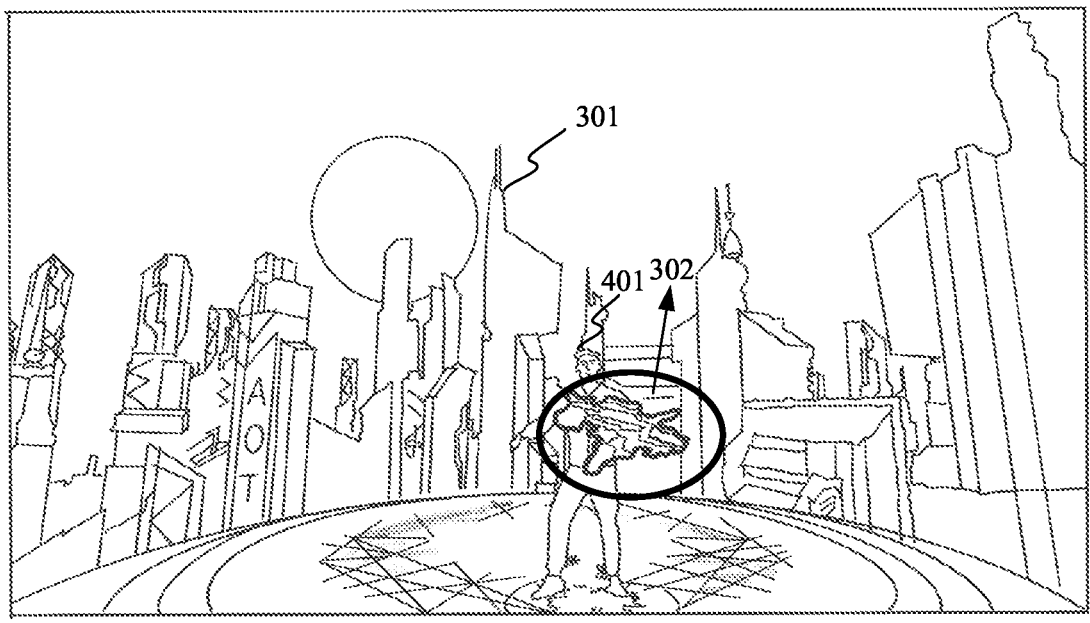
FIG. 6 is a schematic diagram of a first picture according to an exemplary embodiment of this application.

The first picture includes the first foreground target displayed in the three-dimensional virtual scene based on the first depth information when the first foreground target has the first depth information relative to the first camera. At this moment, this embodiment can also ensure that the front-back hierarchical relationship between the scene background and the foreground target is correct. Illustratively, in FIG. 3, an aircraft 302 is at the uppermost layer. In FIG. 6, the aircraft 302 blocks the first foreground target 401, indicating that the aircraft 302 and the first foreground target 401 are located in different layers. The layer where the aircraft 302 is located is in a front layer, indicating that the front-back hierarchical relationship between the aircraft 302 and the first foreground target 401 is correct.

Step 208: Provide the first picture to the first terminal associated with the first client for displaying the first picture.

After receiving the first picture, the first client displays the first picture. In a possible implementation, the server codes the first picture to obtain a first code. The server provides the first code to the first client.

In summary, in this embodiment, during picture generation, a three-dimensional virtual scene needs to be rendered only once to obtain a scene background rendering map, and then the scene background rendering map is blended with a first foreground target rendering map to obtain a picture. Since the whole process only renders the three-dimensional virtual scene once, not only a technology of thousand people with thousand faces is achieved, but also the performance consumption is smaller, the bearing limit is higher, the rendering efficiency is higher, and the cost is saved.

In addition, in this embodiment, the process of rendering a first picture is decoupled into: rendering a three-dimensional virtual scene and a first foreground target respectively, and then blending the three-dimensional virtual scene and the first foreground target, whereby the three-dimensional virtual scene and the first foreground target are independent of each other and support being blended with each other, and the same three-dimensional virtual scene may be adapted to multiple foreground targets. Conversely, the same foreground target may also be adapted to multiple three-dimensional virtual scenes.

In an implementation of this application, the embodiment shown in FIG. 2 is applied to a cloud game scene, whereby a technology of "thousand people with thousand faces" may be achieved. When different pictures are generated, a three-dimensional virtual scene only needs to be rendered once, whereby the rendering efficiency can be improved, and the cost can be saved. When being applied to a cloud game scene, the client in this embodiment of this application may be referred to as a cloud game client at this moment, the server may be referred to as a cloud game server, and the picture is a cloud game picture.

Figure 8:
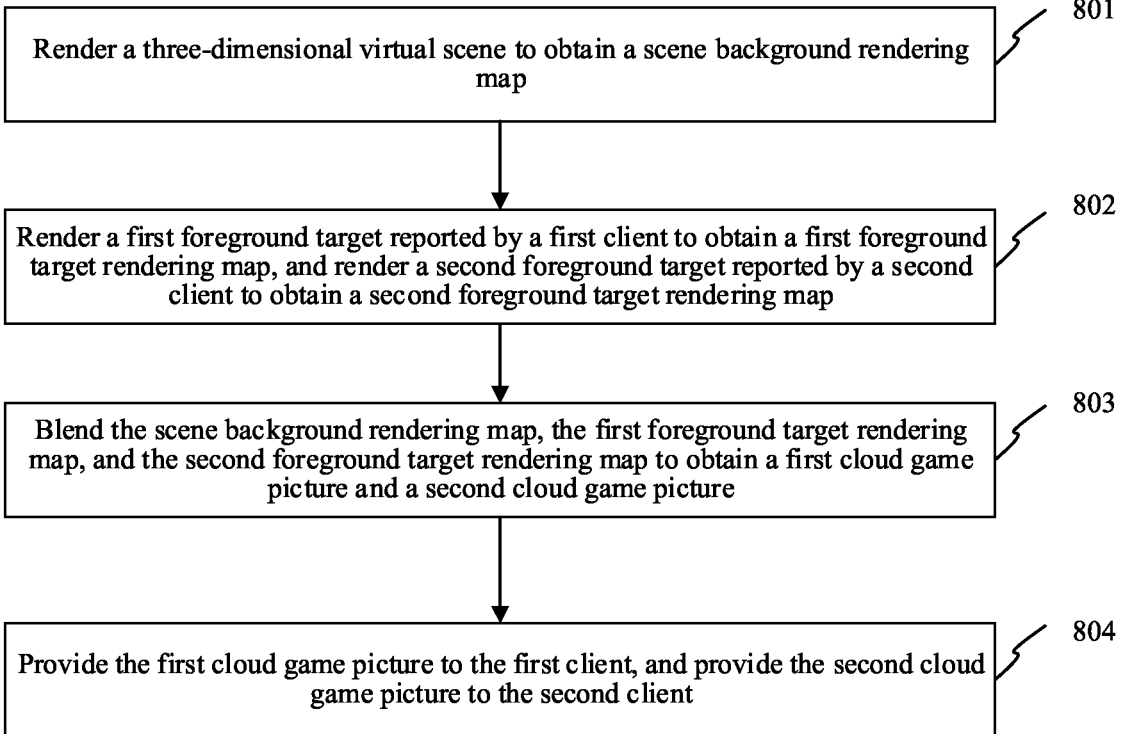
FIG. 8 is a schematic flowchart of a cloud game picture generation method according to an exemplary embodiment of this application.

FIG. 8 shows a schematic flowchart of a cloud game picture generation method according to an embodiment of this application. The method is applied to a server. The server is connected to at least two clients. The method may be applied to the server 140 shown in FIG. 1. The method includes the following steps:

Step 801: Render a three-dimensional virtual scene to obtain a scene background rendering map.

The three-dimensional virtual scene may be set by a technician or a user. Illustratively, the three-dimensional virtual scene is a virtual scene in a cloud game. Illustratively, the three-dimensional virtual scene is a virtual scene in a cloud conference.

The scene background rendering map is a two-dimensional image obtained by rendering the three-dimensional virtual scene. Illustratively, as shown in FIG. 3, a three-dimensional virtual scene 301 is rendered to obtain a scene background rendering map.

Step 802: Render a first foreground target reported by a first terminal associated with a first client to obtain a first foreground target rendering map, and render a second foreground target reported by a second client to obtain a second foreground target rendering map.

A first picture includes a first foreground target displayed in the three-dimensional virtual scene based on first depth information when the first foreground target has the first depth information relative to a first camera.

The first foreground target rendering map is a two-dimensional image obtained by rendering the first foreground target. Illustratively, as shown in FIG. 4, a first foreground target 401 is rendered to obtain a first foreground target rendering map.

A second picture includes a second foreground target displayed in the three-dimensional virtual scene based on second depth information when the second foreground target has the second depth information relative to a second camera.

Figure 5:
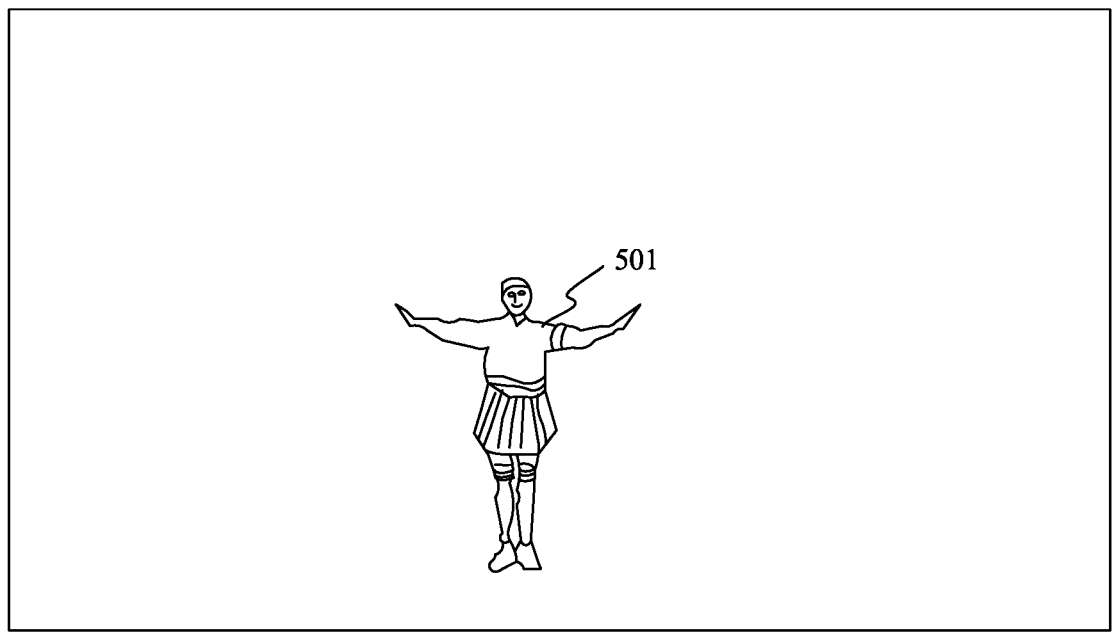
FIG. 5 is a schematic diagram of a second foreground target according to an exemplary embodiment of this application.

The second foreground target rendering map is a two-dimensional image obtained by rendering the second foreground target. Illustratively, as shown in FIG. 5, a second foreground target 501 is rendered to obtain a second foreground target rendering map.

The first camera is a camera on a terminal where the first client is located, or the first camera is a camera connected to the terminal where the first client is located. Similarly, the second camera is a camera on a terminal where the second client is located, or the second camera is a camera connected to the terminal where the first client is located.

In an implementation of this application, the first foreground target is a user avatar. In some embodiments, when multiple user avatars are acquired by the first camera, each of the multiple user avatars is taken as the first foreground target, or a user avatar closest to the first camera among the multiple user avatars is taken as the first foreground target, or a user avatar located in a specified region is taken as the first foreground target, or a first target user avatar among the multiple user avatars is taken as the first foreground target. The first target user avatar is a user avatar recognized by a face.

In an implementation of this application, the second foreground target is a user avatar. In some embodiments, when multiple user avatars are acquired by the second camera, each of the multiple user avatars is taken as the second foreground target, or a user avatar closest to the second camera among the multiple user avatars is taken as the second foreground target, or a user avatar located in a specified region is taken as the second foreground target, or a second target user avatar among the multiple user avatars is taken as the second foreground target. The second target user avatar is a user avatar recognized by a face.

In an implementation of this application, the first foreground target is a user body image. In some embodiments, when multiple user body images are acquired by the first camera, each of the multiple user body images is taken as the first foreground target, or a user body image closest to the first camera among the multiple user body images is taken as the first foreground target, or a user body image located in a specified region is taken as the first foreground target, or a first target user body image among the multiple user body images is taken as the first foreground target. The first target user body image is a user body image obtained by action matching.

In an implementation of this application, the second foreground target is a user body image. In some embodiments, when multiple user body images are acquired by the second camera, each of the multiple user body images is taken as the second foreground target, or a user body image closest to the second camera among the multiple user body images is taken as the second foreground target, or a user body image located in a specified region is taken as the second foreground target, or a second target user body image among the multiple user body images is taken as the second foreground target. The second target user body image is a user body image obtained by action matching.

Step 803: Blend the scene background rendering map, the first foreground target rendering map, and the second foreground target rendering map to obtain a first cloud game picture and a second cloud game picture.

It is to be noted that foreground targets in the first cloud game picture and the second cloud game picture are different, and scene backgrounds in the first cloud game picture and the second cloud game picture are the same scene background.

Figure 7:
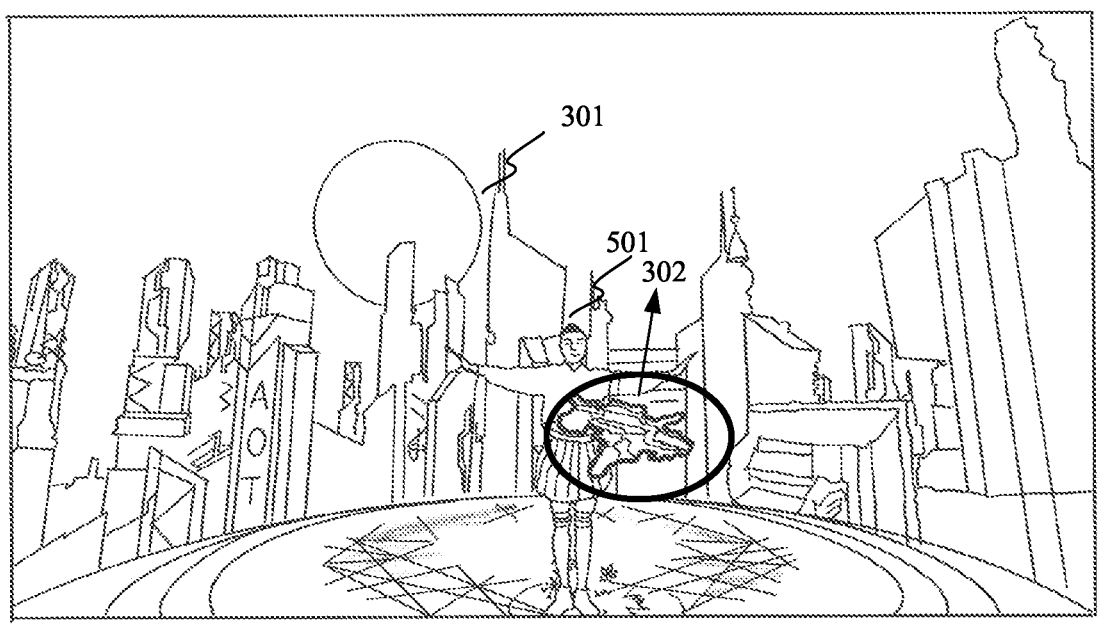
FIG. 7 is a schematic diagram of a second picture according to an exemplary embodiment of this application.

Illustratively, as shown in FIG. 6 and FIG. 7, in FIG. 6, the foreground target in the first cloud game picture is the first foreground target 401 and the scene background is the three-dimensional virtual scene 301. In FIG. 7, the foreground target in the second cloud game picture is the second foreground target 501 and the scene background is the three-dimensional virtual scene 301. Therefore, foreground targets in the first cloud game picture and the second cloud game picture are different, and scene backgrounds in the first cloud game picture and the second cloud game picture are the same scene background.

In this embodiment of this application, the first cloud game picture and the second cloud game picture are pictures rendered according to a front-back hierarchical relationship between the three-dimensional virtual scene and the foreground target. In some embodiments, a front-back hierarchical relationship between the three-dimensional virtual scene and the foreground target is determined according to scene depth information of the three-dimensional virtual scene and depth information of the foreground target. In some embodiments, the scene background rendering map and the first foreground target rendering map are blended according to scene depth information and first depth information of the three-dimensional virtual scene to obtain the first cloud game picture. The scene background rendering map and a second foreground target rendering map are blended according to the scene depth information and second depth information to obtain the second cloud game picture.

This embodiment can also ensure that the front-back hierarchical relationship between the scene background and the foreground target is correct. Illustratively, in FIG. 3, an aircraft 302 is at the uppermost layer. In FIG. 6, the aircraft 302 blocks the first foreground target 401, indicating that the aircraft 302 and the first foreground target 401 are located in different layers. The layer where the aircraft 302 is located is in a front layer, indicating that the front-back hierarchical relationship between the aircraft 302 and the first foreground target 401 is correct. In FIG. 7, the aircraft 302 blocks the second foreground target 501, indicating that the aircraft 302 and the second foreground target 501 are located in different layers. The layer where the aircraft 302 is located is in a front layer, indicating that the front-back hierarchical relationship between the aircraft 302 and the second foreground target 501 is correct.

In some embodiments, when the first cloud game picture is generated, the first cloud game picture further includes a third foreground target. The third foreground target is acquired by a third client via a third camera. The server is connected to the third client. The type of the third client is different from other clients connected to the server. The other clients include the first client. At this moment, the first cloud game picture is obtained by blending the scene background rendering map, a third foreground target rendering map, and the first foreground target rendering map.

The third foreground target rendering map is obtained by rendering the third foreground target transmitted by the third client.

In some embodiments, when the second cloud game picture is generated, the second cloud game picture further includes a third foreground target. The third foreground target is acquired by a third client via a third camera. The server is connected to the third client. The type of the third client is different from other clients connected to the server. The other clients include the second client. At this moment, the second cloud game picture is obtained by blending the scene background rendering map, a third foreground target rendering map, and the second foreground target rendering map. The third foreground target rendering map is obtained by rendering the third foreground target transmitted by the third client.

Step 804: Provide the first cloud game picture to the first client, and provide the second cloud game picture to the second client.

After receiving the first cloud game picture, the first client displays the first cloud game picture. After receiving the second cloud game picture, the second client displays the second cloud game picture. In a possible implementation, the server codes the first cloud game picture to obtain a first code. The server provides the first code to the first client. The server codes the second cloud game picture to obtain a second code. The server provides the second code to the second client.

In summary, in this embodiment, when multiple different cloud game pictures are generated, a three-dimensional virtual scene needs to be rendered only once to obtain a scene background rendering map, and then the scene background rendering map is blended with a first foreground target rendering map and a second foreground target rendering map to obtain two different cloud game pictures. Since the whole process only renders the three-dimensional virtual scene once, not only a technology of thousand people with thousand faces is achieved, but also the performance consumption is smaller, the bearing limit is higher, the rendering efficiency is higher, and the cost is saved.

FIG. 9 shows a schematic flowchart of a picture generation method according to an embodiment of this application. The method is applied to a server. The server is connected to at least two clients. The method may be applied to the server 140 shown in FIG. 1. The method includes the following steps:

Step 901: Render a three-dimensional virtual scene to obtain a scene background rendering map.

The three-dimensional virtual scene may be set by a technician or a user. The scene background rendering map is a two-dimensional image obtained by rendering the three-dimensional virtual scene. Illustratively, as shown in FIG. 3, a three-dimensional virtual scene is rendered to obtain a scene background rendering map 301.

Step 902: Render a first foreground target reported by a first terminal associated with a first client to obtain a first foreground target rendering map, and render a second foreground target reported by a second client to obtain a second foreground target rendering map.

The first foreground target has first depth information relative to a first camera. The first depth information refers to a distance between the first foreground target and the first camera. The first camera is a camera for acquiring the first foreground target. The second foreground target has second depth information relative to a second camera. The second depth information refers to a distance between the second foreground target and the second camera. The second camera is a camera for acquiring the second foreground target.

The first camera is a camera on a terminal where the first client is located, or the first camera is a camera connected to the terminal where the first client is located. Similarly, the second camera is a camera on a terminal where the second client is located, or the second camera is a camera connected to the terminal where the first client is located.

Step 903: Obtain a first scene background color of each pixel point in a first picture according to scene depth information, first depth information, and the scene background rendering map.

Figure 10:
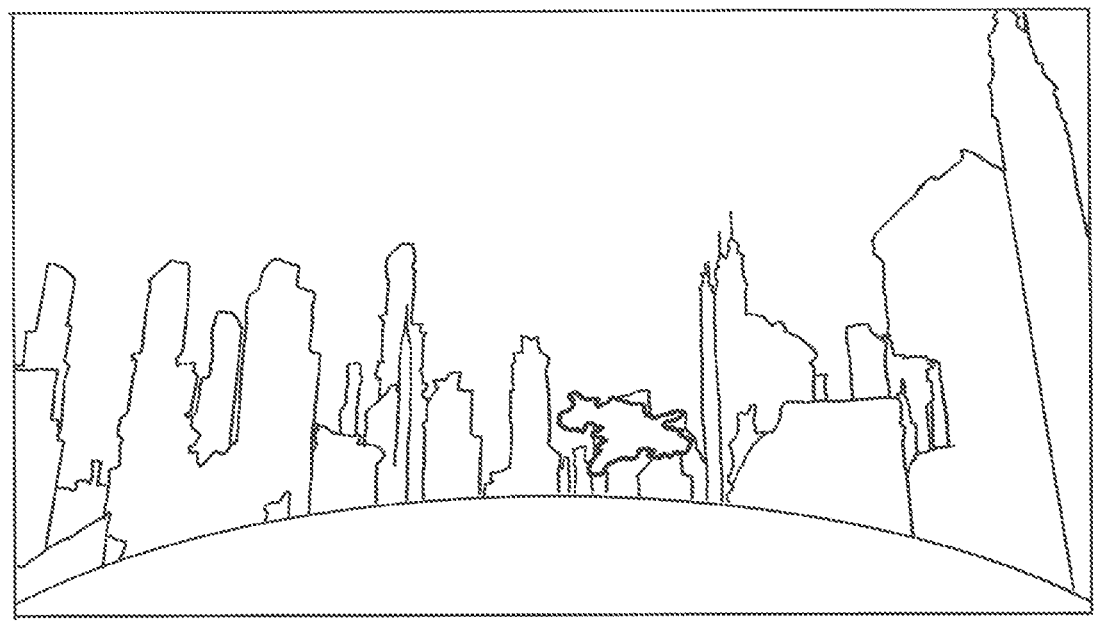
FIG. 10 is a schematic diagram of a scene background depth rendering map according to an exemplary embodiment of this application.
Figure 11:
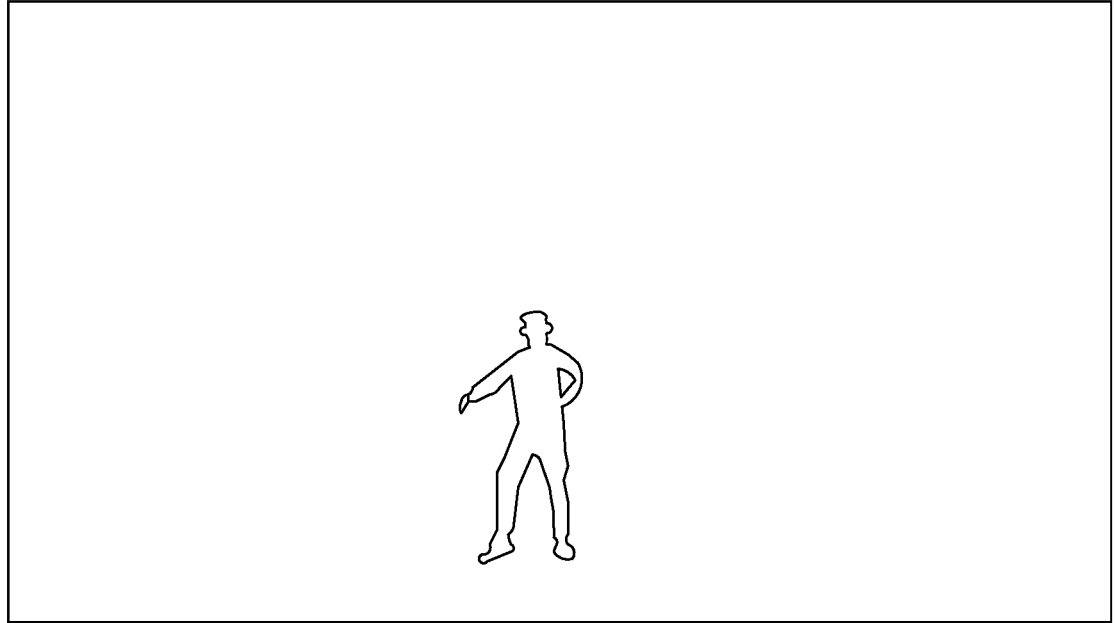
FIG. 11 is a schematic diagram of a first depth information rendering map according to an exemplary embodiment of this application.

In some embodiments, the scene depth information is rendered to obtain a scene depth information rendering map, and the first depth information is rendered to obtain a first depth information rendering map. The first scene background color of each pixel point in the first picture is obtained according to the scene depth information rendering map, the first depth information rendering map, and the scene background rendering map. As shown in FIG. 10, the scene depth information is rendered to obtain a scene depth information rendering map. As shown in FIG. 11, the first depth information is rendered to obtain a first depth information rendering map.

The scene depth information refers to a distance between an object in the three-dimensional virtual scene and a scene camera. The scene camera is a virtual camera for acquiring the three-dimensional virtual scene. In one embodiment, depth information of all vertices of the object in the three-dimensional virtual scene is recorded, and a depth information rendering map of the object is rendered according to the depth information of all the vertices.

The first scene background color is used for measuring the degree of influence of a color of the scene background rendering map on a color of the first picture.

For example, the pixel point is an $i^{th}$ pixel point in the first picture, where i is a positive integer, and i is related to the quantity of pixel points in the first picture. This step may include the following sub-steps:

1: Determine, for the $i^{th}$ pixel point in the first picture, a first depth weight parameter of the $i^{th}$ pixel point according to $i^{th}$ scene depth information corresponding to the $i^{th}$ pixel point in the scene depth information and $i^{th}$ first depth information corresponding to the $i^{th}$ pixel point in the first depth information.

It is assumed that the $i^{th}$ scene depth information corresponding to the $i^{th}$ pixel point in the scene depth information is D0 and the $i^{th}$ first depth information corresponding to the $i^{th}$ pixel point in the first depth information is D1. When D0>D1, the first depth weight parameter P of the $i^{th}$ pixel point is denoted as 0. When D0≤D1, the first depth weight parameter P of the $i^{th}$ pixel point is denoted as 1.

2: Calculate a sum of the first depth weight parameter of the $i^{th}$ pixel point and a transparency of the $i^{th}$ pixel point in the first foreground target rendering map to obtain a first color blending weight of the $i^{th}$ pixel point.

Assuming that the transparency of the $i^{th}$ pixel point in the first foreground target rendering map is A1, the first color blending weight of the $i^{th}$ pixel point is $P0=P+(1-A1)$, and P0 is defined in an interval [0, 1] through a clamp function (interval definition function). If P0 falls within the interval [0, 1], a return value of the clamp function is P0. If P0 is less than 0, the return value of the clamp function is 0. If P0 is greater than 0, the return value of the clamp function is 1.

3: Calculate a product of the first color blending weight of the $i^{th}$ pixel point and a color of the $i^{th}$ pixel point in the scene background rendering map to obtain a first scene background color of the $i^{th}$ pixel point in the first picture.

Assuming that the color of the $i^{th}$ pixel point in the scene background rendering map is C0, the first scene background color of the $i^{th}$ pixel point in the first picture is R0=C0*P0 (P0 herein is P0 defined by the clamp function).

4: Repeat the three steps until the first scene background color of each pixel point in the first picture is obtained.

Since the foregoing sub-step 1 to sub-step 3 only obtain the first scene background color of the $i^{th}$ pixel point in the first picture, it is necessary to repeat the foregoing sub-step 1 to sub-step 3, so as to obtain the first scene background color of each pixel point in the first picture.

Step 904: Obtain a first foreground target color of each pixel point in the first picture according to the scene depth information, the first depth information, and the first foreground target rendering map.

The first foreground target color is used for measuring the degree of influence of a color of the first foreground target rendering map on a color of the first picture.

For example, the pixel point is a $j^{th}$ pixel point in the first picture, where j is a positive integer, and j is related to the quantity of pixel points in the first picture. This step may include the following sub-steps:

1: Determine, for the $j^{th}$ pixel point in the first picture, a first depth weight parameter of the $j^{th}$ pixel point according to $j^{th}$ scene depth information corresponding to the $j^{th}$ pixel point in the scene depth information and $j^{th}$ first depth information corresponding to the $j^{th}$ pixel point in the first depth information.

It is assumed that the $j^{th}$ scene depth information corresponding to the $j^{th}$ pixel point in the scene depth information is D0 and the $j^{th}$ first depth information corresponding to the $j^{th}$ pixel point in the first depth information is D1. When D0>D1, the first depth weight parameter P of the $j^{th}$ pixel point is denoted as 0. When D0≤D1, the first depth weight parameter P of the $j^{th}$ pixel point is denoted as 1.

2: Calculate a product of the first depth weight parameter of the $j^{th}$ pixel point, a transparency of the $j^{th}$ pixel point in the first foreground target rendering map, and a color of the $j^{th}$ pixel point in the first foreground target rendering map to obtain a first foreground target color of the $j^{th}$ pixel point in the first picture.

Assuming that the transparency of the $i^{th}$ pixel point in the first foreground target rendering map is A1 and the color of the $j^{th}$ pixel point in the first foreground target rendering map is C1, the first foreground target color of the $j^{th}$ pixel point in the first picture is R1=(1−P)*C1*A1.

3: Repeat the two steps until the first foreground target color of each pixel point in the first picture is obtained.

Since the foregoing sub-step 1 and sub-step 2 only obtain the first scene background color of the $i^{th}$ pixel point in the first picture, it is necessary to repeat the foregoing sub-step 1 to sub-step 2, so as to obtain the first scene background color of each pixel point in the first picture.

Step 905: Calculate a sum of the first scene background color and the first foreground target color of each pixel point in the first picture to obtain the first picture.

Assuming that the first scene background color of any pixel point in the first picture is R0 and the first foreground target color is R1, the color of any pixel point in the first picture is R=R0+R1.

Step 906: Obtain a second scene background color of each pixel point in a second picture according to the scene depth information, second depth information, and the scene background rendering map.

Figure 12:
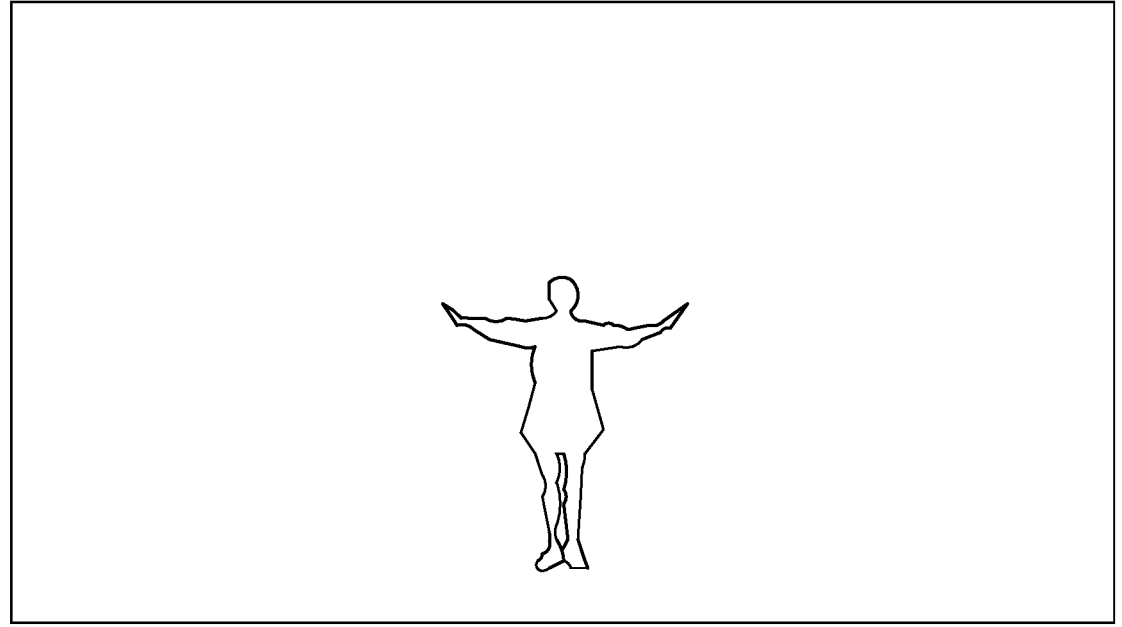
FIG. 12 is a schematic diagram of a second depth information rendering map according to an exemplary embodiment of this application.

In some embodiments, the scene depth information is rendered to obtain a scene depth information rendering map, and the second depth information is rendered to obtain a second depth information rendering map. The second scene background color of each pixel point in the second picture is obtained according to the scene depth information rendering map, the second depth information rendering map, and the scene background rendering map. As shown in FIG. 10, the scene depth information is rendered to obtain a scene depth information rendering map. As shown in FIG. 12, the second depth information is rendered to obtain a second depth information rendering map.

The second scene background color is used for measuring the degree of influence of a color of the scene background rendering map on a color of the second picture.

For example, the pixel point is an $m^{th}$ pixel point in the second picture, where m is a positive integer, and m is related to the quantity of pixel points in the second picture. This step may include the following sub-steps:

1: Determine, for the $m^{th}$ pixel point in the second picture, a second depth weight parameter of the $m^{th}$ pixel point according to $m^{th}$ scene depth information corresponding to the $m^{th}$ pixel point in the scene depth information and $m^{th}$ second depth information corresponding to the $m^{th}$ pixel point in the second depth information.

It is assumed that the $m^{th}$ scene depth information corresponding to the $m^{th}$ pixel point in the scene depth information is D0 and the $m^{th}$ second depth information corresponding to the $m^{th}$ pixel point in the second depth information is D1. When D0>D1, the second depth weight parameter P of the $m^{th}$ pixel point is denoted as 0. When D0≤D1, the second depth weight parameter P of the $m^{th}$ pixel point is denoted as 1.

2: Calculate a sum of the second depth weight parameter of the $m^{th}$ pixel point and a transparency of the $m^{th}$ pixel point in the second foreground target rendering map to obtain a second color blending weight of the $m^{th}$ pixel point.

Assuming that the transparency of the $m^{th}$ pixel point in the second foreground target rendering map is A1, the second color blending weight of the $m^{th}$ pixel point is P0=P+(1−A1), and P0 is defined in an interval [0, 1] through a clamp function (interval definition function). If P0 falls within the interval [0, 1], a return value of the clamp function is P0. If P0 is less than 0, the return value of the clamp function is 0. If P0 is greater than 0, the return value of the clamp function is 1.

3: Calculate a product of the second color blending weight of the $m^{th}$ pixel point and a color of the $m^{th}$ pixel point in the scene background rendering map to obtain a second scene background color of the $m^{th}$ pixel point in the second picture.

Assuming that the color of the $m^{th}$ pixel point in the scene background rendering map is C0, the second scene background color of the $m^{th}$ pixel point in the second picture is R0=C0*P0.

4: Repeat the three steps until the second scene background color of each pixel point in the second picture is obtained.

Since the foregoing sub-step 1 to sub-step 3 only obtain the second scene background color of the $m^{th}$ pixel point in the second picture, it is necessary to repeat the foregoing sub-step 1 to sub-step 3, so as to obtain the second scene background color of each pixel point in the second picture.

Step 907: Obtain a second foreground target color of each pixel point in the second picture according to the scene depth information, the second depth information, and the second foreground target rendering map.

The second foreground target color is used for measuring the degree of influence of a color of the second foreground target rendering map on a color of the second picture.

For example, the pixel point is an $n^{th}$ pixel point in the second picture, where n is a positive integer, and n is related to the quantity of pixel points in the second picture. This step may include the following sub-steps:

1: Determine, for the $n^{th}$ pixel point in the second picture, a second depth weight parameter of the $n^{th}$ pixel point according to $n^{th}$ scene depth information corresponding to the $n^{th}$ pixel point in the scene depth information and $n^{th}$ second depth information corresponding to the $n^{th}$ pixel point in the second depth information.

It is assumed that the $n^{th}$ scene depth information corresponding to the $n^{th}$ pixel point in the scene depth information is D0 and the $n^{th}$ second depth information corresponding to the $n^{th}$ pixel point in the second depth information is D1. When D0>D1, the second depth weight parameter P of the $n^{th}$ pixel point is denoted as 0. When D0≤D1, the second depth weight parameter P of the $n^{th}$ pixel point is denoted as 1.

2: Calculate a product of the second depth weight parameter of the $n^{th}$ pixel point, a transparency of the $n^{th}$ pixel point in the second foreground target rendering map, and a color of the $n^{th}$ pixel point in the second foreground target rendering map to obtain a second foreground target color of the $n^{th}$ pixel point in the second picture.

Assuming that the transparency of the $n^{th}$ pixel point in the second foreground target rendering map is A1 and the color of the $n^{th}$ pixel point in the second foreground target rendering map is C1, the second foreground target color of the $n^{th}$ pixel point in the second picture is R1=(1−P)*C1*A1.

3: Repeat the two steps until the second foreground target color of each pixel point in the second picture is obtained.

Since the foregoing sub-step 1 and sub-step 2 only obtain the second scene background color of the $n^{th}$ pixel point in the second picture, it is necessary to repeat the foregoing sub-step 1 to sub-step 2, so as to obtain the second scene background color of each pixel point in the second picture.

Step 908: Calculate a sum of the second scene background color and the second foreground target color of each pixel point in the second picture to obtain the second picture.

Assuming that the second scene background color of any pixel point in the second picture is R0 and the second foreground target color is R1, the color of any pixel point in the second picture is R=R0+R1.

Step 909: Provide the first picture to the first terminal associated with the first client for displaying the first picture, and provide the second picture to the second terminal associated with the second client for displaying the second picture. In some embodiments, the first picture and the second picture are generated separately such that the first picture does not include the second foreground target and the second picture does not include the first foreground target.

Foreground targets in the first picture and the second picture are different, and scene backgrounds in the first picture and the second picture are the same scene background.

After receiving the first picture, the first client displays the first picture. After receiving the second picture, the second client displays the second picture.

In a possible implementation, the server codes the first picture to obtain a first code. The server provides the first code to the first client. The server codes the second picture to obtain a second code. The server provides the second code to the second client.

In summary, in this embodiment, when multiple different pictures are generated, a three-dimensional virtual scene needs to be rendered only once to obtain a scene background rendering map, and then the scene background rendering map is blended with a first foreground target rendering map and a second foreground target rendering map to obtain two different pictures. Since the whole process only renders the three-dimensional virtual scene once, not only a technology of thousand people with thousand faces is achieved, but also the performance consumption is smaller, the bearing limit is higher, the rendering efficiency is higher, and the cost is saved.

In addition, this embodiment can blend a front-back hierarchical relationship effect, highlight a spatial hierarchical relationship between a foreground target and a scene background, and obtain a more reasonable picture.

Figure 13:
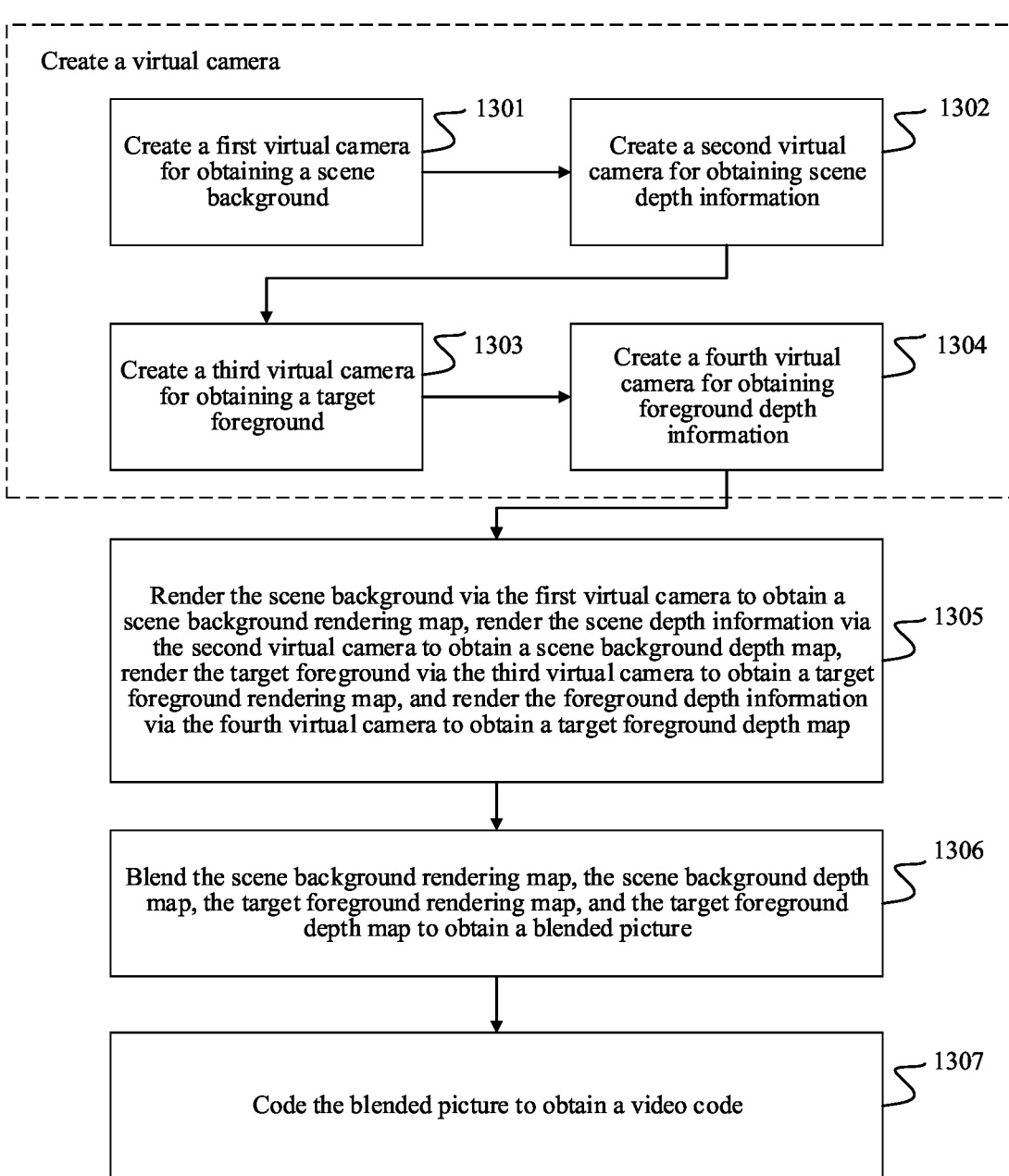
FIG. 13 is a schematic flowchart of a picture generation method according to an exemplary embodiment of this application.

FIG. 13 shows a schematic flowchart of a picture generation method according to an embodiment of this application. The method is applied to a server. The server is connected to at least two clients. The method may be applied to the server 140 shown in FIG. 1. The method includes the following steps:

Step 1301: Create a first virtual camera for obtaining a scene background.

The first virtual camera is configured to obtain data corresponding to the scene background. In some embodiments, when the server obtains the data corresponding to the scene background in other manners, it is not necessary to create the first virtual camera.

Step 1302: Create a second virtual camera for obtaining scene depth information.

The second virtual camera is configured to obtain data corresponding to the scene depth information. In some embodiments, when the server obtains the data corresponding to the scene depth information in other manners, it is not necessary to create the second virtual camera.

Step 1303: Create a third virtual camera for obtaining a target foreground.

The third virtual camera is configured to obtain data corresponding to the target foreground. In some embodiments, when the server obtains the data corresponding to the target foreground in other manners, it is not necessary to create the third virtual camera.

Step 1304: Create a fourth virtual camera for obtaining foreground depth information.

The fourth virtual camera is configured to obtain data corresponding to the foreground depth information. In some embodiments, when the server obtains the data corresponding to the foreground depth information in other manners, it is not necessary to create the fourth virtual camera.

It is to be noted that the foregoing step 1301 to step 1304 may be sorted in any combination without any order.

Step 1305: Render the scene background via the first virtual camera to obtain a scene background rendering map, render the scene depth information via the second virtual camera to obtain a scene background depth map, render the target foreground via the third virtual camera to obtain a target foreground rendering map, and render the foreground depth information via the fourth virtual camera to obtain a target foreground depth map.

In some embodiments, after the server renders the scene background via the first virtual camera to obtain the scene background rendering map, the server will store the scene background in texture corresponding to the scene background.

In some embodiments, after the server renders the scene depth information via the second virtual camera to obtain the scene background depth map, the server will store the scene depth information in texture corresponding to the scene depth information.

In some embodiments, after the server renders the target foreground via the third virtual camera to obtain the target foreground rendering map, the server will store the target foreground in texture corresponding to the target foreground.

In some embodiments, after the server renders the foreground depth information via the fourth virtual camera to obtain the target foreground depth map, the server will store the foreground depth information in texture corresponding to the foreground depth information.

Step 1306: Blend the scene background rendering map, the scene background depth map, the target foreground rendering map, and the target foreground depth map to obtain a blended picture.

The blended picture includes a foreground target displayed in the scene background based on the scene depth information and the foreground depth information.

Step 1307: Code the blended picture to obtain a video code.

The server may provide the video code to the client. After obtaining the video code, the client decodes the video code to obtain the blended picture.

In summary, this embodiment creates rendering maps and depth maps via virtual cameras, and blends a scene background rendering map and a target foreground rendering map via scene depth information and foreground depth information to obtain a blended picture. Since the whole process only renders the three-dimensional virtual scene once, the performance consumption is smaller, the bearing limit is higher, the rendering efficiency is higher, and the cost is saved.

Figure 14:
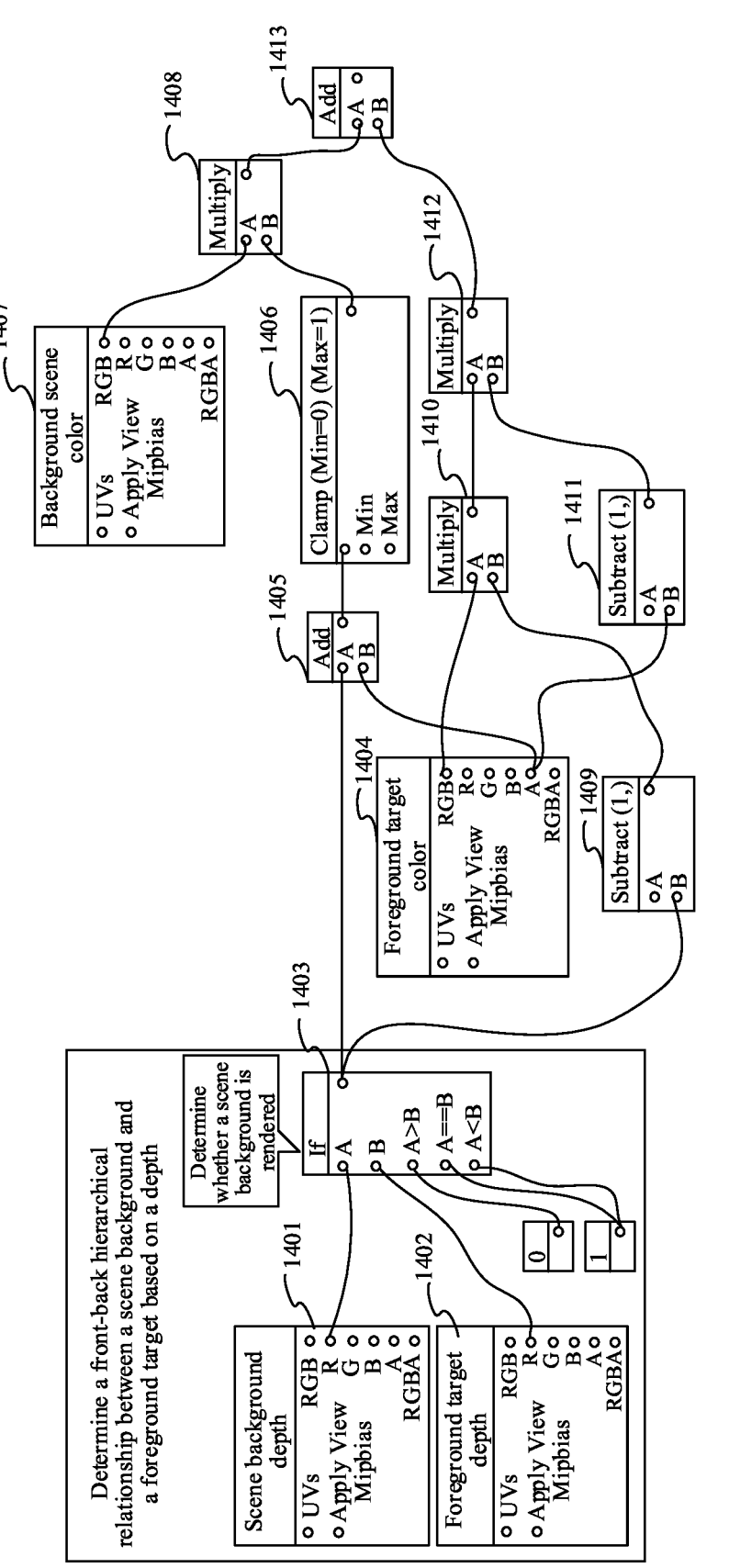
FIG. 14 is a schematic diagram of a method for calculating a color of a pixel point according to an exemplary embodiment of this application.

FIG. 14 shows a schematic diagram of a method for calculating a color of a pixel point according to an embodiment of this application. The method is applied to a server. The server is connected to at least two clients. The method may be applied to the server 140 shown in FIG. 1. The method is used for calculating the color of a pixel point of the first picture or the second picture in the embodiment shown in FIG. 2.

The schematic diagram includes a scene background depth 1401, a foreground target depth 1402, a foreground target color 1404, and a background scene color 1407. An R end of the scene background depth 1401 outputs scene depth information of the pixel point. An R end of the foreground target depth 1402 outputs foreground depth information of the pixel point. An RGB end of the foreground target color 1404 outputs the color of the pixel point in the foreground target rendering map, and an A end of the foreground target color 1404 outputs the transparency of the pixel point in the foreground target rendering map. An RGB end of the background scene color 1407 outputs the color of the pixel point in the background scene rendering map.

In the schematic diagram, the scene depth information of the pixel point outputted by the scene background depth 1401 and the foreground depth information of the pixel point outputted by the foreground target depth 1402 are inputted together into a condition determiner 1403, and the output of the condition determiner 1403 is a depth weight parameter P of the pixel point. The condition determiner 1403 is configured to determine whether the scene background is rendered. When the scene depth information is greater than the foreground depth information, the depth weight parameter P outputted by the condition determiner 1403 is 0. When the scene depth information is less than or equal to the foreground depth information, the depth weight parameter P outputted by the condition determiner 1403 is 1.

After obtaining the depth weight parameter P, the output of the condition determiner 1403 is divided into two paths. One path is inputted to an adder 1405, and the other path is inputted to a subtractor 1409. First, the path of the output of the condition determiner 1403 inputted into the adder 1405 is introduced. The input of the adder 1405 is the depth weight parameter P of the pixel point and the output of the A end of the foreground target color 1404 is a transparency $(1-A1)$ of the pixel point in the foreground target rendering map (the output of the A end of the foreground target color 1404 is the inverse of the transparency of the pixel point in the foreground target rendering map, and in other implementations, the output of the A end of the foreground target color 1404 may also be the transparency A1 of the pixel point in the foreground target rendering map), and the output of the adder 1405 is a color blending weight $P0=P+(1-A1)$. The adder 1405 inputs the color blending weight into an interval definer 1406. The interval definer 1406 is configured to define the input value in the interval $[0, 1]$. If the inputted color blending weight P0 falls within the interval $[0, 1]$, the output of the interval definer 1406 is P0. If the inputted color blending weight P0 is less than 0, the output of the interval definer 1406 is 0. If the inputted color blending weight P0 is greater than 1, the output of the interval definer 1406 is 1. Then, an output P3 of the interval definer 1406 and a color C0 of the pixel point in the background scene rendering map outputted from the RGB end of the background scene color 1407 are inputted to a multiplier 1408, and the multiplier 1408 outputs a scene background color R0 of the pixel point. Finally, the scene background color R0 of the pixel point is inputted into an adder 1413.

Next, the path of the output of the condition determiner 1403 inputted to the subtractor 1409 will be described. The output of the subtractor 1409 is $(1-P)$, and the subtractor 1409 inputs the output into a multiplier 1410. The multiplier 1410 multiplies the inputted $(1-P)$ with a color C1 of the pixel point in the foreground target rendering map outputted from the RGB end of the foreground target color 1404, to obtain $(1-P)*C1$. The multiplier 1410 then inputs $(1-P)*C1$ into a multiplier 1412. The other input of the multiplier 1412 is the transparency A1 of the pixel point in the foreground target rendering map outputted by a subtractor 1411. The input of the subtractor 1411 is the transparency $(1-A1)$ of the pixel point in the foreground target rendering map. The subtractor 1411 obtains the output of the subtractor 1411 by calculating $1-(1-A1)=A1$. The multiplier 1412 multiplies the inputted $(1-P)*C1$ and A1 to obtain a foreground target color R1 of the pixel point, and finally inputs the foreground target color R1 of the pixel point into the adder 1413. The adder 1413 adds the scene background color R0 and the foreground target color R1 to obtain a color R of the pixel point of the first picture or the second picture.

Figure 15:
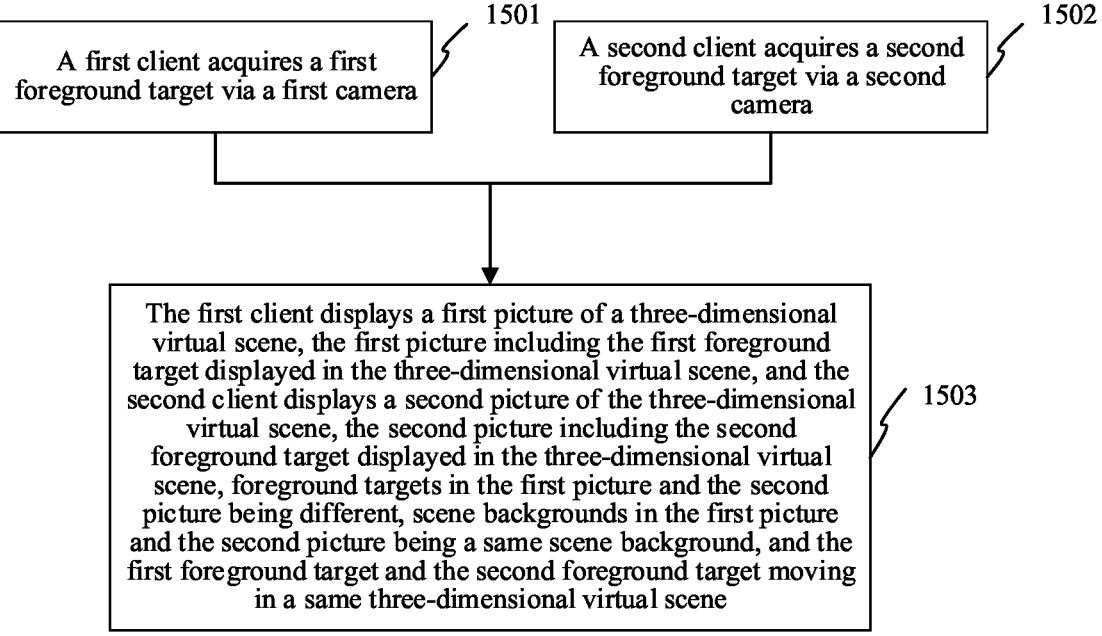
FIG. 15 is a schematic flowchart of an interaction method according to an exemplary embodiment of this application.

FIG. 15 shows a schematic flowchart of an interaction method according to an embodiment of this application. The method is applied to at least two clients. The solution may be implemented by the terminal 120 shown in FIG. 1. The method includes the following steps:

Step 1501: A first client acquires a first foreground target via a first camera.

The first client is at least one of the at least two clients. The first camera is a camera on a terminal where the first client is located, or the first camera is a camera connected to the terminal where the first client is located.

In an implementation of this application, the first foreground target refers to a user image. In some embodiments, when multiple user avatars are acquired by the first camera, each of the multiple user avatars is taken as the first foreground target, or a user avatar closest to the first camera among the multiple user avatars is taken as the first foreground target, or a user avatar located in a specified region is taken as the first foreground target, or a first target user avatar among the multiple user avatars is taken as the first foreground target. The first target user avatar is a user avatar recognized by a face.

Illustratively, as shown in FIG. 4, the first client acquires the first foreground target 401.

Step 1502: A second client acquires a second foreground target via a second camera.

The second client is at least one of the at least two clients. The second camera is a camera on a terminal where the second client is located, or the second camera is a camera connected to the terminal where the second client is located.

In an implementation of this application, the second foreground target refers to a user avatar. In some embodiments, when multiple user avatars are acquired by the second camera, each of the multiple user avatars is taken as the second foreground target, or a user avatar closest to the second camera among the multiple user avatars is taken as the second foreground target, or a user avatar located in a specified region is taken as the second foreground target, or a second target user avatar among the multiple user avatars is taken as the second foreground target. The second target user avatar is a user avatar recognized by a face. Illustratively, as shown in FIG. 5, the second client acquires the second foreground target 501.

Step 1503: The first client displays a first picture of a three-dimensional virtual scene, the first picture including the first foreground target displayed in the three-dimensional virtual scene, and the second client displays a second picture of the three-dimensional virtual scene, the second picture including the second foreground target displayed in the three-dimensional virtual scene, foreground targets in the first picture and the second picture being different, scene backgrounds in the first picture and the second picture being a same scene background, and the first foreground target and the second foreground target moving in a same three-dimensional virtual scene.

It is to be noted that the first picture is obtained by blending a first foreground target rendering map and a scene background rendering map via the server, and the first foreground target rendering map is obtained by rendering the first foreground target via the server. The second picture is obtained by blending a second foreground target rendering map and the scene background rendering map via the server, and the second foreground target rendering map is obtained by rendering the second foreground target via the server. The scene background rendering map is obtained by rendering the three-dimensional virtual scene. Illustratively, as shown in FIG. 3, the first picture displays the first foreground target in the three-dimensional virtual scene, and the second picture displays the second foreground target in the three-dimensional virtual scene.

In some embodiments, the first foreground target and the second foreground target participate in the same battle in the same three-dimensional virtual scene. For example, in a cloud game scene, the first client and the second client participate in the same battle, and the first foreground target and the second foreground target may move in the same three-dimensional virtual scene.

In other implementations of this application, the displayed first foreground target and second foreground target may be replaced with other figures. In some embodiments, the first picture includes a first virtual figure displayed in the three-dimensional virtual scene based on the first depth information and a second virtual figure displayed in the three-dimensional virtual scene based on the second depth information. The first virtual figure corresponds to the first foreground target, and the second virtual figure corresponds to the second foreground target. Illustratively, when the target foreground is a real person, the first foreground target corresponds to a virtual figure of a monkey appearance, and the second foreground target corresponds to a virtual figure of a panda appearance. Then, when the first picture is displayed, the first picture includes the virtual figure of the monkey appearance in the three-dimensional virtual scene, and when the second picture is displayed, the second picture includes the virtual figure of the panda appearance in the three-dimensional virtual scene.

In summary, this embodiment provides an interaction method that can display pictures including different foreground targets on different clients. A technology of thousand people with thousand faces is achieved, and personalized display solutions are provided for users to facilitate the interaction between users.

Figure 16:
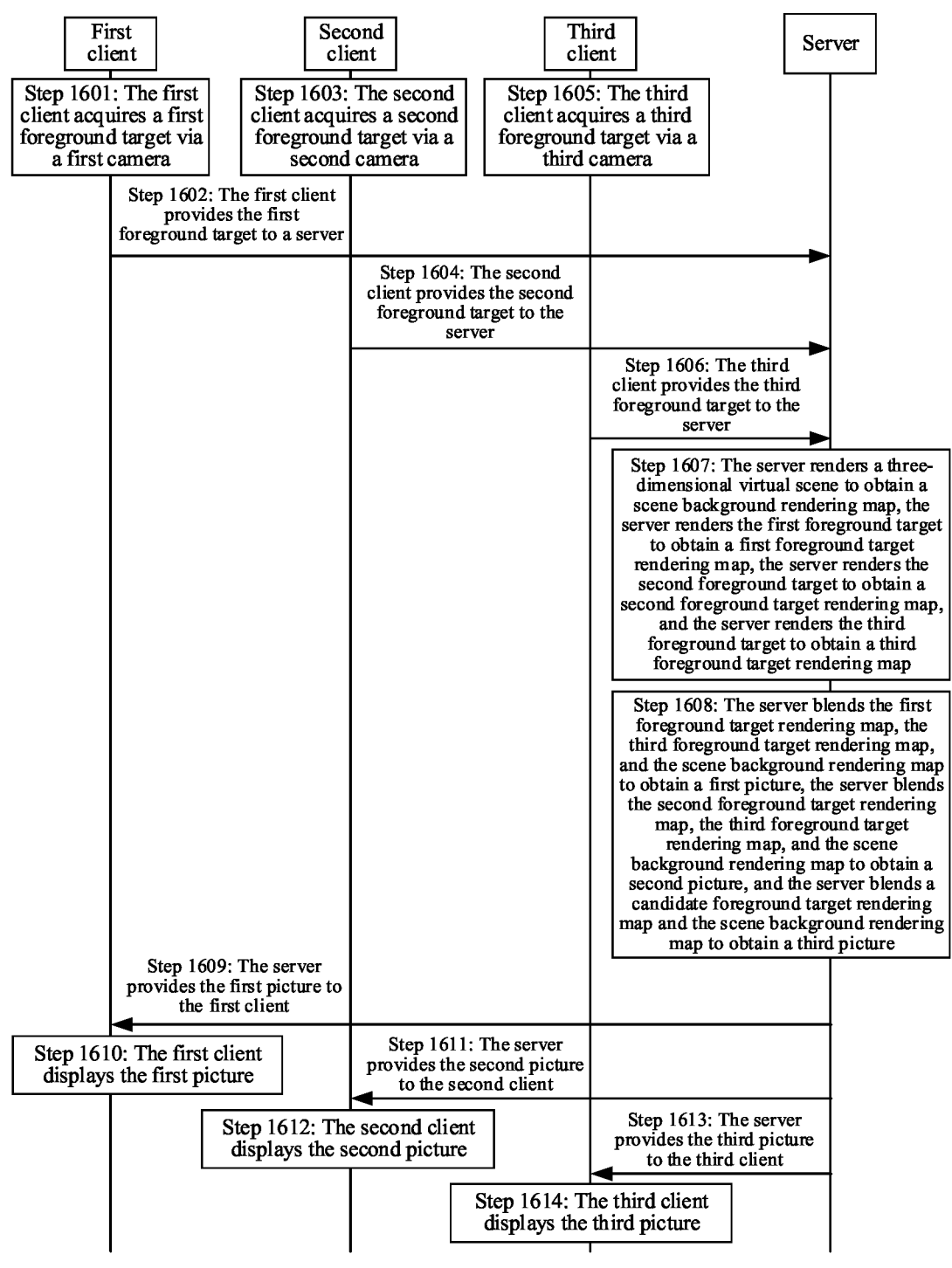
FIG. 16 is a schematic flowchart of a livestreaming interaction method according to an exemplary embodiment of this application.

Illustratively, the embodiment shown in FIG. 15 may be applied in multiple real scenes. In the following embodiments, livestreaming is exemplified. FIG. 16 shows a schematic flowchart of a livestreaming interaction method according to an embodiment of this application. The method is applied to at least three clients. The at least three clients are connected to a server for providing a three-dimensional virtual scene. The type of a third client is different from other clients connected to the server. The solution may be implemented by the computer system 100 shown in FIG. 1. The method includes the following steps:

Step 1601: A first client acquires a first foreground target via a first camera.

The first camera is a camera on a terminal where the first client is located, or the first camera is a camera connected to the terminal where the first client is located. The first foreground target has first depth information relative to the first camera.

In another implementation of this application, the first client obtains the first foreground target via a memory or the first client obtains the first foreground target by accessing the network.

Step 1602: The first client provides the first foreground target to a server.

The first client transmits a first target foreground to the server.

Step 1603: A second client acquires a second foreground target via a second camera.

The second camera is a camera on a terminal where the second client is located, or the second camera is a camera connected to the terminal where the second client is located. In another implementation of this application, the second client obtains the second foreground target via a memory or the second client obtains the second foreground target by accessing the network.

The second foreground target has second depth information relative to the second camera.

Step 1604: The second client provides the second foreground target to the server.

The second client transmits the second foreground target to the server.

Step 1605: A third client acquires a third foreground target via a third camera.

In a specific implementation of this application, the third client is a livestreamer client, and the other clients are user clients. The third camera is a camera on a terminal where the third client is located, or the third camera is a camera connected to the terminal where the third client is located.

In another implementation of this application, the third client obtains the third foreground target via a memory or the third client obtains the third foreground target by accessing the network.

The third foreground target has third depth information relative to the third camera.

Step 1606: The third client provides the third foreground target to the server.

The third client transmits the third foreground target to the server.

Step 1607: The server renders a three-dimensional virtual scene to obtain a scene background rendering map, the server renders the first foreground target to obtain a first foreground target rendering map, the server renders the second foreground target to obtain a second foreground target rendering map, and the server renders the third foreground target to obtain a third foreground target rendering map.

The scene background rendering map is a two-dimensional image obtained by rendering the three-dimensional virtual scene. The first foreground target rendering map is a two-dimensional image obtained by rendering the first foreground target. The second foreground target rendering map is a two-dimensional image obtained by rendering the second foreground target. The third foreground target rendering map is a two-dimensional image obtained by rendering the third foreground target.

Step 1608: The server blends the first foreground target rendering map, the third foreground target rendering map, and the scene background rendering map to obtain a first picture, the server blends the second foreground target rendering map, the third foreground target rendering map, and the scene background rendering map to obtain a second picture, and the server blends a candidate foreground target rendering map and the scene background rendering map to obtain a third picture.

The first picture includes the first foreground target displayed in the three-dimensional virtual scene based on the first depth information and the third foreground target displayed in the three-dimensional virtual scene based on the third depth information.

The second picture includes the second foreground target displayed in the three-dimensional virtual scene based on the second depth information and the third foreground target displayed in the three-dimensional virtual scene based on the third depth information.

The third picture includes candidate foreground targets displayed in the three-dimensional virtual scene based on candidate depth information. The candidate foreground targets are foreground targets corresponding to the other clients. For example, the candidate foreground targets are one of the foregoing foreground targets.

Step 1609: The server provides the first picture to the first terminal associated with the first client for displaying the first picture.

The server transmits the coded first picture to the first client.

Step 1610: The first client displays the first picture.

Figure 17:
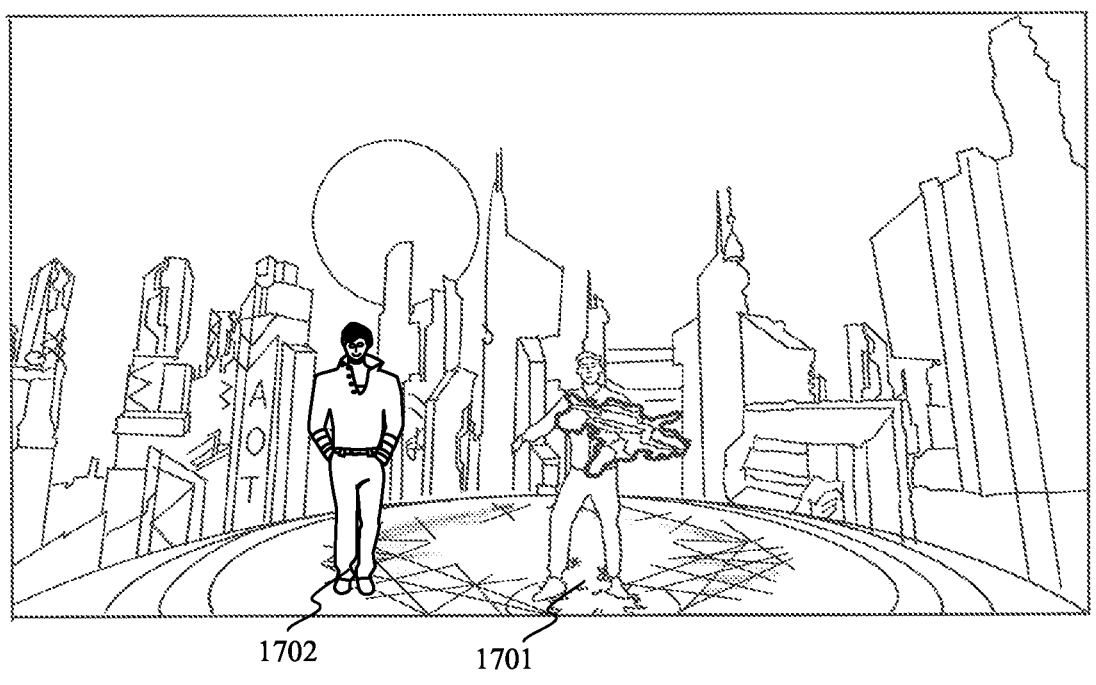
FIG. 17 is a schematic diagram of a first picture according to an exemplary embodiment of this application.

Illustratively, as shown in FIG. 17, the first picture includes a first foreground target 1701 and a third foreground target 1702.

Step 1611: The server provides the second picture to the second terminal associated with the second client for displaying the second picture.

The server transmits the coded second picture to the second client.

Step 1612: The second client displays the second picture.

Figure 18:
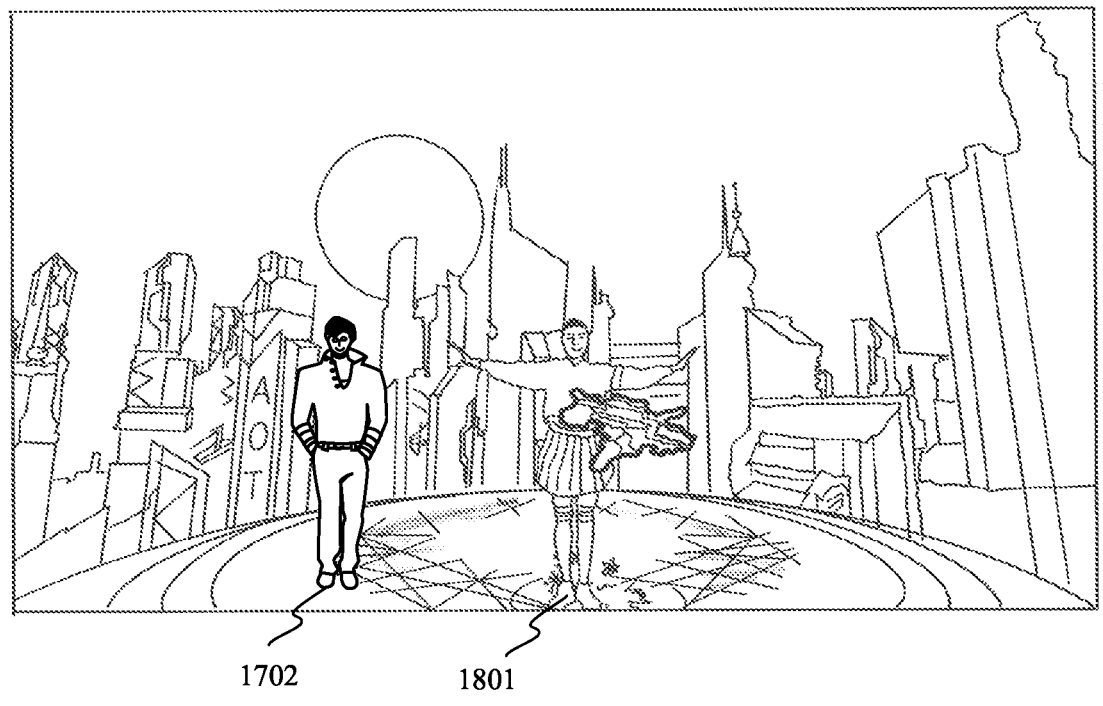
FIG. 18 is a schematic diagram of a second picture according to an exemplary embodiment of this application.

Illustratively, as shown in FIG. 18, the second picture includes a second foreground target 1801 and the third foreground target 1702.

Step 1613: The server provides the third picture to the third client.

The server transmits the coded third picture to the third client.

Step 1614: The third client displays the third picture.

When the third client is a livestreamer client, a user corresponding to the third client may choose to display the candidate foreground targets on the second client. In some embodiments, the third client displays user information of the other clients. In response to a selection operation for target user information in the user information on the third client, the third client displays a foreground target corresponding to the target user information. Illustratively, as shown, after the user corresponding to the third client clicks/taps on target user information, the corresponding foreground target is displayed in the third picture.

In some embodiments, in response to a hiding operation on the third client, the third client stops displaying the user information.

Figure 19:
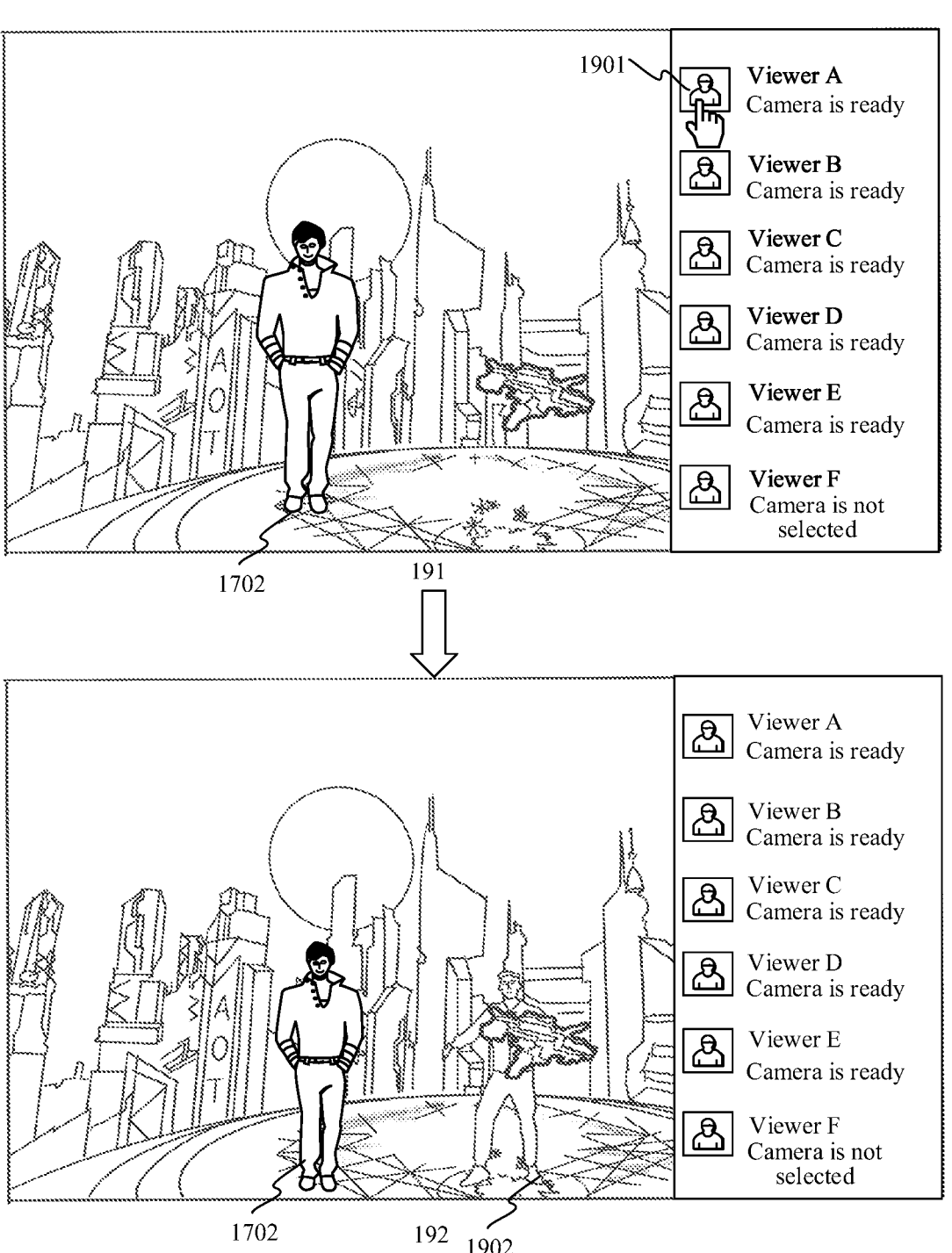
FIG. 19 is a schematic diagram of a third picture according to an exemplary embodiment of this application.

Illustratively, as shown in FIG. 19, the third foreground target 1702 is displayed in a third picture 191, and user information is displayed on the right side of the third picture. The user clicks/taps on target user information 1901 in the user information, an interface is displayed as shown in a third picture 192, and a foreground target 1902 corresponding to the target user information 1901 is displayed in the third picture 192.

In an actual livestreaming process, a livestreamer may select livestreaming content. Therefore, the livestreamer may modify the used three-dimensional virtual scene. In some embodiments, the three-dimensional virtual scene is switched in response to a scene switching operation on the third client. For example, a three-dimensional virtual scene of a city night scene is switched to a three-dimensional virtual scene of a star.

In summary, in this embodiment, during livestreaming, a three-dimensional virtual scene needs to be rendered only once to obtain a scene background rendering map, and then the scene background rendering map is blended with different foreground target rendering maps to obtain different pictures. Since the whole process only renders the three-dimensional virtual scene once, the performance consumption is smaller, the bearing limit is higher, the rendering efficiency is higher, and the cost is saved.

In the following embodiments, a game battle is exemplified. When the game scene is a cloud game scene, the client in this embodiment of this application may be referred to as a cloud game client at this moment, the server may be referred to as a cloud game server, and the picture is a cloud game picture.

Figure 20:
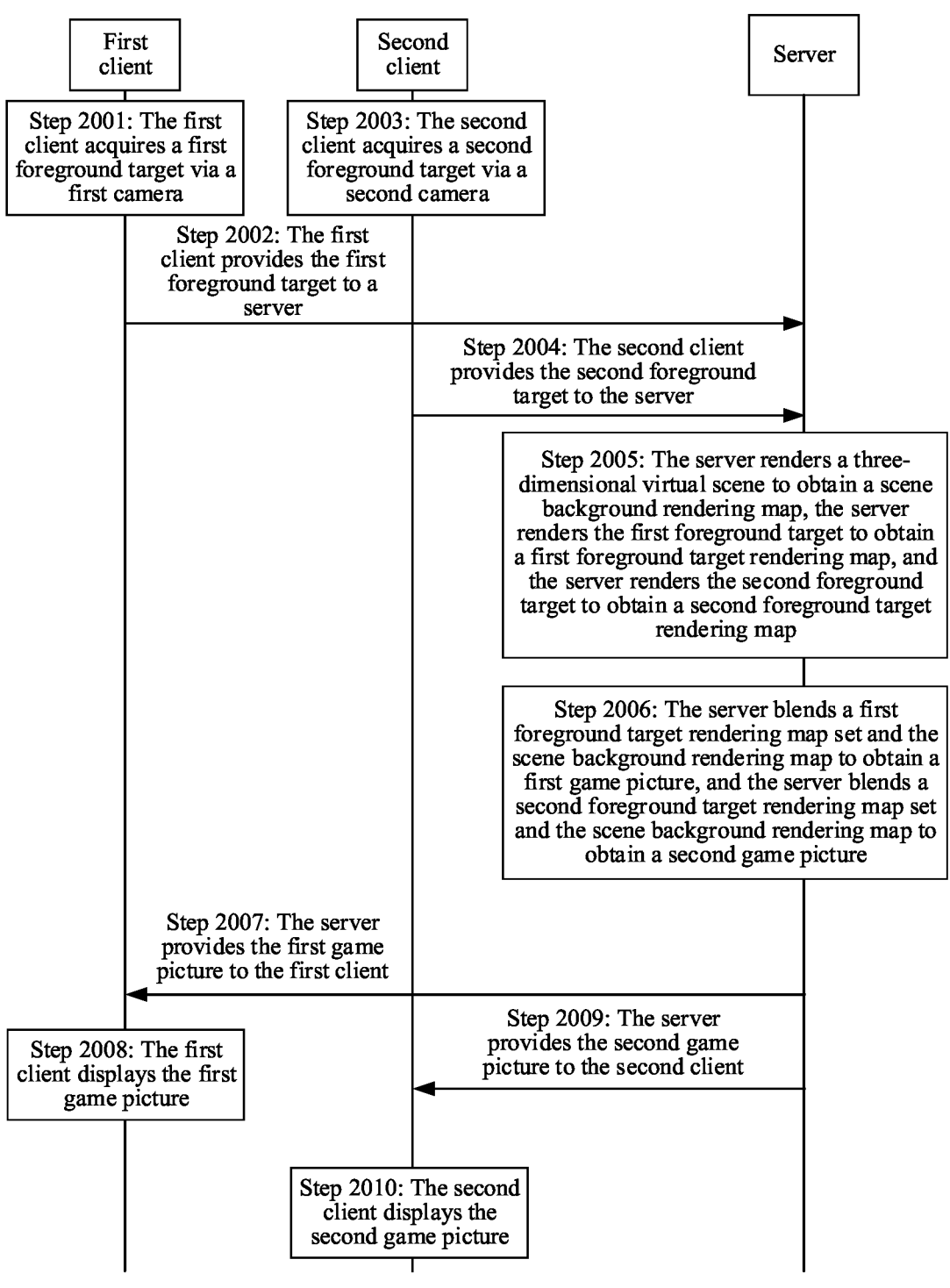
FIG. 20 is a schematic flowchart of a game battle method according to an exemplary embodiment of this application.

FIG. 20 shows a schematic flowchart of a game battle method according to an embodiment of this application. The method is applied to at least two clients. The solution may be implemented by the computer system 100 shown in FIG. 1. The method includes the following steps:

Step 2001: A first client acquires a first foreground target via a first camera.

The first camera is a camera on a terminal where the first client is located, or the first camera is a camera connected to the terminal where the first client is located. The first foreground target has first depth information relative to the first camera.

In another implementation of this application, the first client obtains the first foreground target via a memory or the first client obtains the first foreground target by accessing the network.

Step 2002: The first client provides the first foreground target to a server.

The first client transmits a first target foreground to the server.

Step 2003: A second client acquires a second foreground target via a second camera.

The second camera is a camera on a terminal where the second client is located, or the second camera is a camera connected to the terminal where the second client is located.

In another implementation of this application, the second client obtains the second foreground target via a memory or the second client obtains the second foreground target by accessing the network.

The second foreground target has second depth information relative to the second camera.

Step 2004: The second client provides the second foreground target to the server.

The second client transmits the second foreground target to the server.

Step 2005: The server renders a three-dimensional virtual scene to obtain a scene background rendering map, the server renders the first foreground target to obtain a first foreground target rendering map, and the server renders the second foreground target to obtain a second foreground target rendering map.

The scene background rendering map is a two-dimensional image obtained by rendering the three-dimensional virtual scene.

The first foreground target rendering map is a two-dimensional image obtained by rendering the first foreground target.

The second foreground target rendering map is a two-dimensional image obtained by rendering the second foreground target.

Step 2006: The server blends a first foreground target rendering map set and the scene background rendering map to obtain a first game picture, and the server blends a second foreground target rendering map set and the scene background rendering map to obtain a second game picture.

The first foreground target rendering map set includes at least one of foreground target rendering maps corresponding to clients connected to the server for providing the three-dimensional virtual scene. The first foreground target rendering map set may be determined by a corresponding user of the first client.

Foreground targets included in the first game picture correspond to the first foreground target rendering map set. Illustratively, there are a total of four clients connected to the server for providing the three-dimensional virtual scene. In a game battle, user A desires to display user B and user C participating in the game battle on a first game picture. Then, when the server generates the first game picture, the server blends a foreground target rendering map and a scene background rendering map corresponding to user B and user C to obtain a first picture. The first game picture thus obtained includes user B and user C.

The second foreground target rendering map set includes at least one of foreground target rendering maps corresponding to clients connected to the server for providing the three-dimensional virtual scene. The second foreground target rendering map set may be determined by a corresponding user of the second client.

Foreground targets included in the second game picture correspond to the second foreground target rendering map set.

Step 2007: The server provides the first game picture to the first client.

The server transmits the coded first game picture to the first client.

Step 2008: The first client displays the first game picture.

It is to be noted that the user participating in the game battle is eliminated as the game battle progresses, and therefore the foreground target displayed on the first game picture will be changed. Illustratively, the first game picture includes user A and user B as foreground targets before the game battle starts. If user B is eliminated in the game battle, user B in the first game picture stops to be displayed. Illustratively, the first game picture includes user A and user B as foreground targets before the game battle starts. If user C joins the game battle halfway in the game battle, user C is displayed in the first game picture.

Step 2009: The server provides the second game picture to the second client.

The server transmits the coded second game picture to the second client.

Step 2010: The second client displays the second game picture.

It is to be noted that the user participating in the game battle is eliminated as the game battle progresses, and therefore the foreground target displayed on the second game picture will be changed.

In summary, in this embodiment, in a game battle, a three-dimensional virtual scene needs to be rendered only once to obtain a scene background rendering map, and then the scene background rendering map is blended with different foreground target rendering maps to obtain different pictures. Since the whole process only renders the three-dimensional virtual scene once, the performance consumption is smaller, the bearing limit is higher, the rendering efficiency is higher, and the cost is saved.

Figure 21:
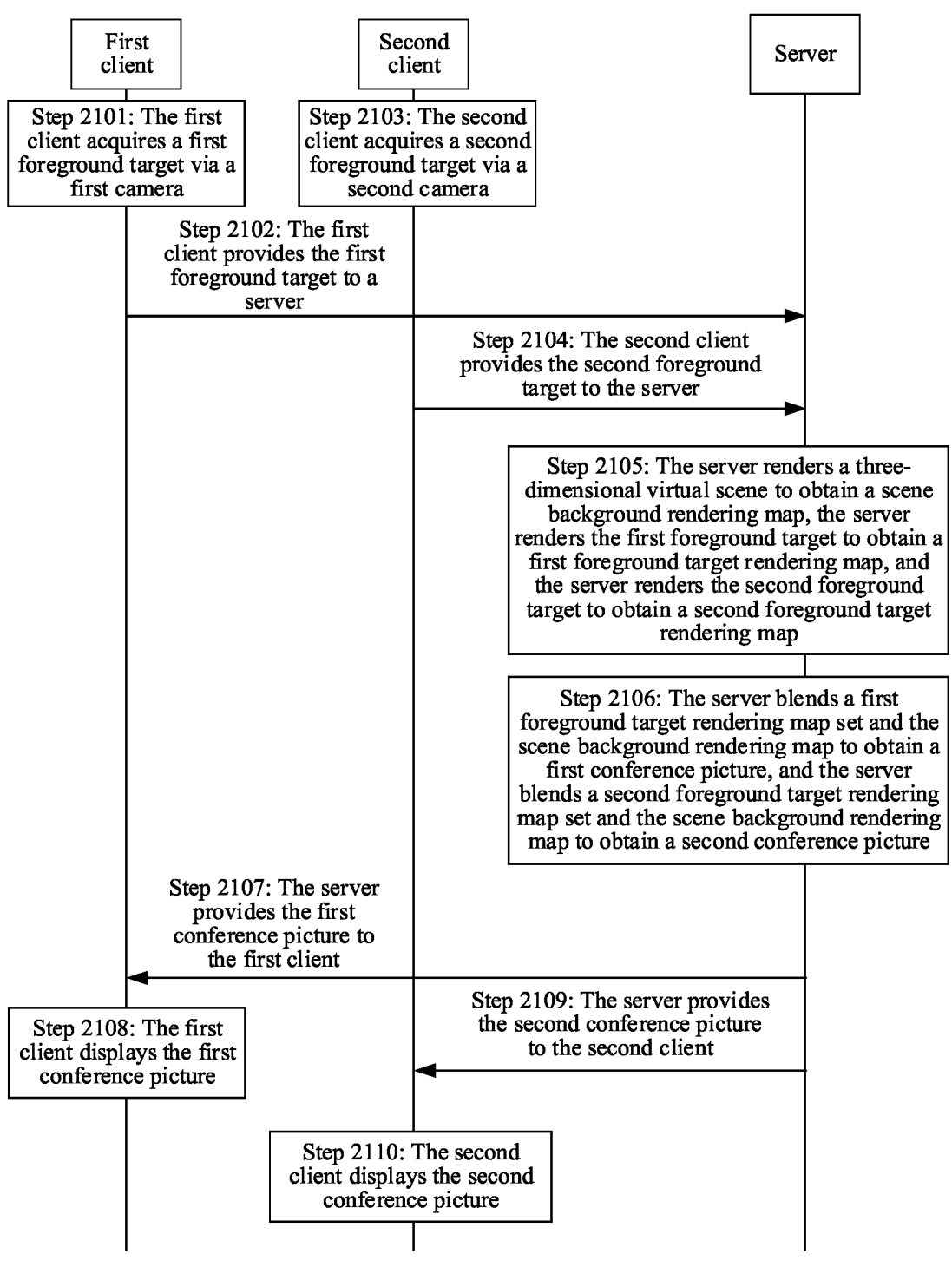
FIG. 21 is a schematic flowchart of an online conference method according to an exemplary embodiment of this application.

In the following embodiments, an online conference is exemplified. FIG. 21 shows a schematic flowchart of an online conference implementation method according to an embodiment of this application. The method is applied to at least two clients. The at least two clients are connected to a server for providing a three-dimensional virtual scene. The solution may be implemented by the computer system 100 shown in FIG. 1. The method includes the following steps:

Step 2101: A first client acquires a first foreground target via a first camera.

The first camera is a camera on a terminal where the first client is located, or the first camera is a camera connected to the terminal where the first client is located. The first foreground target has first depth information relative to the first camera.

In another implementation of this application, the first client obtains the first foreground target via a memory or the first client obtains the first foreground target by accessing the network.

Step 2102: The first client provides the first foreground target to a server.

The first client transmits a first target foreground to the server.

Step 2103: A second client acquires a second foreground target via a second camera.

The second camera is a camera on a terminal where the second client is located, or the second camera is a camera connected to the terminal where the second client is located. In another implementation of this application, the second client obtains the second foreground target via a memory or the second client obtains the second foreground target by accessing the network.

The second foreground target has second depth information relative to the second camera.

Step 2104: The second client provides the second foreground target to the server.

The second client transmits the second foreground target to the server.

Step 2105: The server renders a three-dimensional virtual scene to obtain a scene background rendering map, the server renders the first foreground target to obtain a first foreground target rendering map, and the server renders the second foreground target to obtain a second foreground target rendering map.

The scene background rendering map is a two-dimensional image obtained by rendering the three-dimensional virtual scene. The first foreground target rendering map is a two-dimensional image obtained by rendering the first foreground target. The second foreground target rendering map is a two-dimensional image obtained by rendering the second foreground target.

Step 2106: The server blends a first foreground target rendering map set and the scene background rendering map to obtain a first conference picture, and the server blends a second foreground target rendering map set and the scene background rendering map to obtain a second conference picture.

The first foreground target rendering map set includes at least one of foreground target rendering maps corresponding to clients connected to the server for providing the three-dimensional virtual scene. The first foreground target rendering map set may be determined by a corresponding user of the first client.

Foreground targets included in the first conference picture correspond to the first foreground target rendering map set. Illustratively, there are a total of six clients connected to the server for providing the three-dimensional virtual scene. In a conference battle, user A desires to display user B and user C participating in the conference on a first conference picture. Then, when the server generates the first conference picture, the server blends a foreground target rendering map and a scene background rendering map corresponding to user B and user C to obtain a first picture. The first conference picture thus obtained includes user B and user C.

The second foreground target rendering map set includes at least one of foreground target rendering maps corresponding to clients connected to the server for providing the three-dimensional virtual scene. The second foreground target rendering map set may be determined by a corresponding user of the second client.

Foreground targets included in the second conference picture correspond to the second foreground target rendering map set.

Step 2107: The server provides the first conference picture to the first client.

The server transmits the coded first conference picture to the first client.

Step 2108: The first client displays the first conference picture.

It is to be noted that during the progress of the conference, there may be users leaving the current conference or there may be users entering the current conference, and therefore the foreground target displayed in the first conference picture may be changed. Illustratively, the first conference picture includes user A and user B as foreground targets before the conference starts. If user B leaves the conference during the conference, user B in the first conference picture stops to be displayed. Illustratively, the first conference picture includes user A and user B as foreground targets before the conference starts. If user C joins the conference halfway during the conference, user C is displayed in the first conference picture.

Step 2109: The server provides the second conference picture to the second client.

The server transmits the coded second conference picture to the second client.

Step 2110: The second client displays the second conference picture.

It is to be noted that during the progress of the conference, there may be users leaving the current conference or there may be users entering the current conference, and therefore the foreground target displayed in the second conference picture may be changed.

In summary, in this embodiment, in a conference battle, a three-dimensional virtual scene needs to be rendered only once to obtain a scene background rendering map, and then the scene background rendering map is blended with different foreground target rendering maps to obtain different pictures. Since the whole process only renders the three-dimensional virtual scene once, the performance consumption is smaller, the bearing limit is higher, the rendering efficiency is higher, and the cost is saved.

Figure 22:
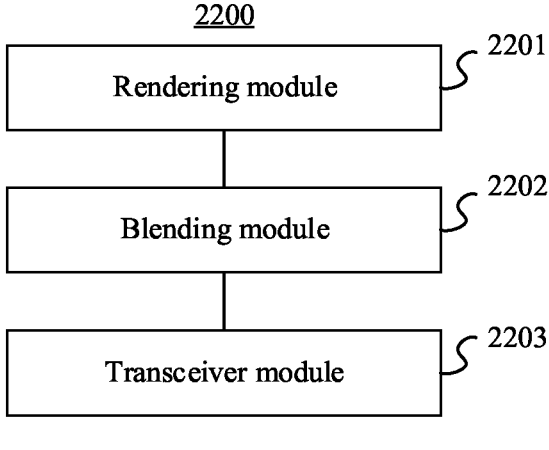
FIG. 22 is a structural block diagram of a picture generation apparatus according to an exemplary embodiment of this application.

FIG. 22 shows a schematic structural diagram of a picture generation apparatus according to an exemplary embodiment of this application. The apparatus 2200 may be implemented in software, hardware or a combination of both as all or part of a computer device. The apparatus specifically includes:

a rendering module 2201, configured to render a three-dimensional virtual scene to obtain a scene background rendering map;

the rendering module 2201, further configured to render a first foreground target reported by a first terminal associated with a first client to obtain a first foreground target rendering map;

a blending module 2202, configured to blend the scene background rendering map and the first foreground target rendering map to obtain a first picture, the first picture including the first foreground target displayed in the three-dimensional virtual scene; and a transceiver module 2203, configured to provide the first picture to the first terminal associated with the first client for displaying the first picture.

It is to be noted that the structural block diagram shown in FIG. 22 serves only as an example of the division of modules, and the above picture generation method may be applied to some or all of the modules shown in FIG. 22.

In summary, when multiple different pictures are generated, a three-dimensional virtual scene needs to be rendered only once to obtain a scene background rendering map, and then the scene background rendering map is blended with a first foreground target rendering map and a second foreground target rendering map to obtain two different pictures. Since the whole process only renders the three-dimensional virtual scene once, not only a technology of thousand people with thousand faces is achieved, but also the number of renderings is reduced, whereby the performance consumption is smaller, the bearing limit is higher, the rendering efficiency is higher, and the cost is saved.

Figure 23:
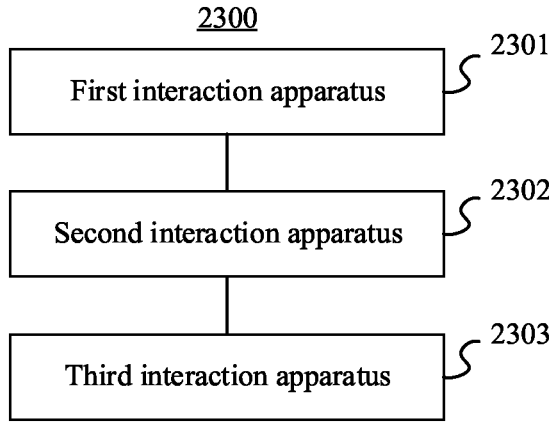
FIG. 23 is a structural block diagram of an interaction system according to an exemplary embodiment of this application.

FIG. 23 shows a schematic structural diagram of an interaction system according to an exemplary embodiment of this application. The system 2300 may be implemented in software, hardware or a combination of both as all or part of a computer device. The system is specifically configured to:

acquire, by a first interaction apparatus 2301, a first foreground target via a first camera; acquire, by a second interaction apparatus 2302, a second foreground target via a second camera;

display, by the first interaction apparatus 2301, a first picture of a three-dimensional virtual scene, the first picture including the first foreground target displayed in the three-dimensional virtual scene; and display, by the second interaction apparatus 2302, a second picture of the three-dimensional virtual scene, the second picture including the second foreground target displayed in the three-dimensional virtual scene, foreground targets in the first picture and the second picture being different, and scene backgrounds in the first picture and the second picture being a same scene background.

In an implementation of this application, a server is further connected to a third interaction apparatus 2303. The type of the third interaction apparatus 2303 is different from other interaction apparatuses connected to the server. The other interaction apparatuses are different and include the first interaction apparatus 2301. The first interaction apparatus 2301 provides a first foreground target to the server. The first interaction apparatus 2301 displays the first picture in response to the first interaction apparatus 2301 receiving the first picture. The first picture and the second picture further include a third foreground target. The third foreground target is acquired by the third interaction apparatus 2303 via a third camera. The third foreground target has third depth information relative to the third camera.

In an implementation of this application, a server is further connected to a third interaction apparatus 2303. The type of the third interaction apparatus 2303 is different from other interaction apparatuses connected to the server. The other interaction apparatuses are different and include the second interaction apparatus 2302. The second interaction apparatus 2302 provides a second foreground target to the server. The second interaction apparatus 2302 displays the second picture in response to the second interaction apparatus 2302 receiving the second picture. The first picture and the second picture further include a third foreground target. The third foreground target is acquired by the third interaction apparatus 2303 via a third camera. The third foreground target has third depth information relative to the third camera.

It is to be noted that the structural block diagram shown in FIG. 23 serves only as an example of the division of modules, and the above interaction method may be applied to some or all of the modules shown in FIG. 23.

In summary, different pictures can be displayed on different interaction apparatuses in this embodiment, thereby providing each user with a personalized picture display. Also, not only a technology of thousand people with thousand faces is achieved, but also the number of renderings is reduced, whereby the performance consumption is smaller, the bearing limit is higher, the rendering efficiency is higher, and the cost is saved.

Figure 24:
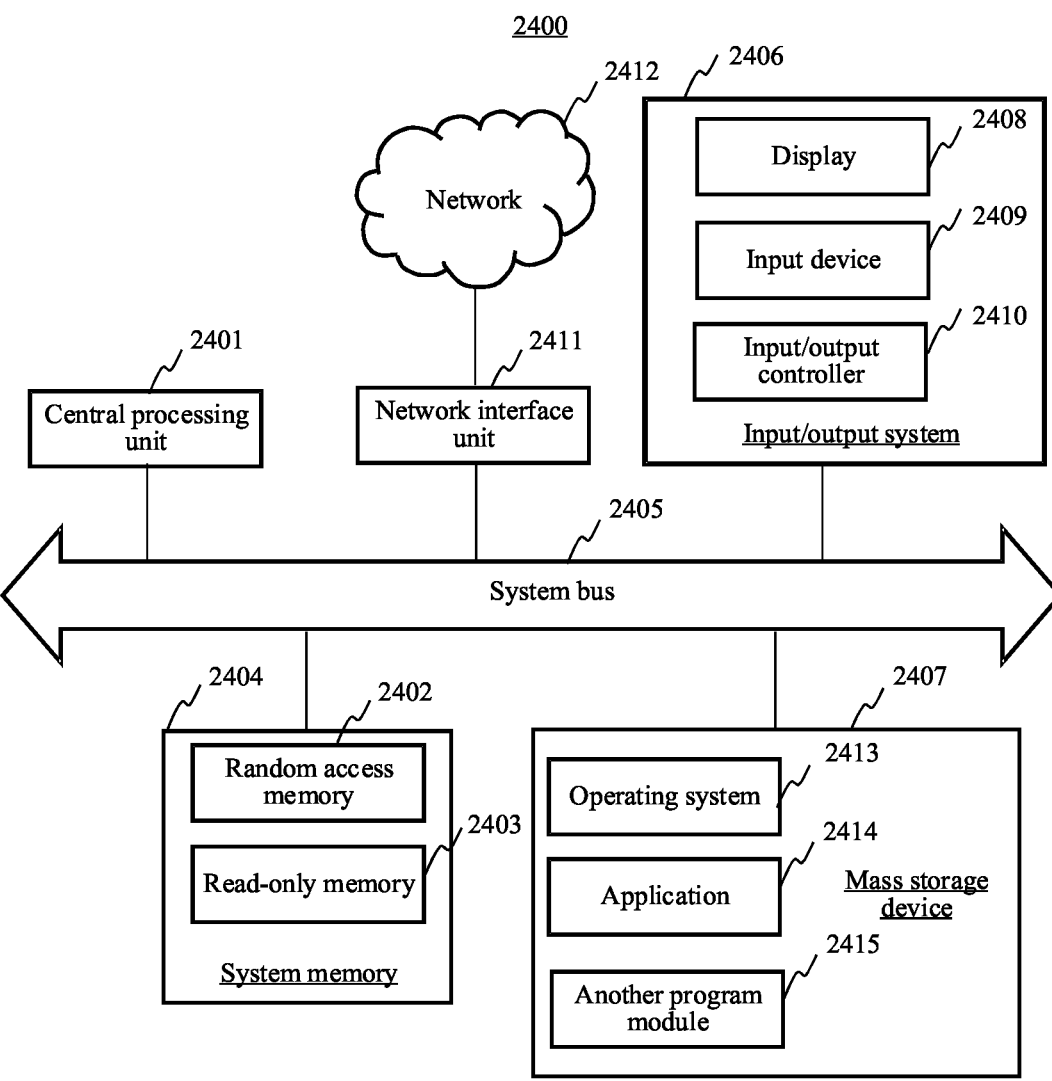
FIG. 24 is a schematic structural diagram of a computer device according to an exemplary embodiment of this application.

FIG. 24 is a schematic structural diagram of a computer device according to an exemplary embodiment. The computer device 2400 includes a CPU 2401, a system memory 2404 including a random access memory (RAM) 2402 and a read-only memory (ROM) 2403, and a system bus 2405 connecting the system memory 2404 and the CPU 2401. The computer device 2400 further includes a basic input/output (I/O) system 2406 that facilitates transfer of information between elements within the computer device, and a mass storage device 2407 that stores an operating system 2413, an application 2414, and another program module 2415.

The basic I/O system 2406 includes a display 2408 for displaying information and an input device 2409 such as a mouse or a keyboard for inputting information by a user. The display 2408 and the input device 2409 are connected to the CPU 2401 through an I/O controller 2410 which is connected to the system bus 2405. The basic I/O system 2406 may further include the I/O controller 2410 for receiving and processing input from multiple other devices, such as a keyboard, a mouse, or an electronic stylus. Similarly, the I/O controller 2410 also provides output to a display screen, a printer, or another type of output device.

The mass storage device 2407 is connected to the CPU 2401 through a mass storage controller (not shown) connected to the system bus 2405. The mass storage device 2407 and a computer device-readable medium associated therewith provide non-volatile storage for the computer device 2400. That is, the mass storage device 2407 may include a computer device-readable medium (not shown) such as a hard disk or a compact disc read-only memory (CD-ROM) drive.

In general, the computer device-readable medium may include a computer device storage medium and a communication medium. The computer device storage medium includes volatile and non-volatile media, and removable and non-removable media implemented by using any method or technology used for storing information such as computer device-readable instructions, data structures, program modules, or other data. The computer device storage medium includes a RAM, a ROM, an erasable programmable read only memory (EPROM), an electrically erasable programmable read-only memory (EEPROM), a CD-ROM, a digital video disc (DVD) or another optical memory, a tape cartridge, a magnetic tape, a magnetic disk memory, or another magnetic storage device. Certainly, a person skilled in the art may learn that the computer device storage medium is not limited to the foregoing several types. The foregoing system memory 2404 and mass storage device 2407 may be collectively referred to as a memory.

According to various embodiments of the present disclosure, the computer device 2400 may also operate through a remote computer device connected to a network through, for example, the Internet. That is, the computer device 2400 may be connected to a network 2411 through a network interface unit 2412 which is connected to the system bus 2405, or may be connected to another type of network or remote computer device system (not shown) by using the network interface unit 2412.

The memory further includes one or more programs. The one or more programs are stored in the memory. The central processing unit 2401 implements all or part of the steps of the foregoing picture generation method or the above-described interaction method by executing the one or more programs.

In an exemplary embodiment, a non-transitory computer-readable storage medium is also provided. The computer-readable storage medium stores at least one instruction, at least one program, a code set, or an instruction set. The at least one instruction, the at least one program, the code set, or the instruction set is loaded and executed by a processor to implement the picture generation method provided in the foregoing various method embodiments or the above-described interaction method.

This application also provides a computer program product or computer program. The computer program product or computer program includes computer instructions. The computer instructions are stored in a non-transitory computer-readable storage medium. A processor of a computer device reads the computer instructions from the computer-readable storage medium. The processor executes the computer instructions, whereby the computer device performs the picture generation method provided in the above embodiment or the above-described interaction method.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

What is claimed is:

1. A picture generation method performed by a computer device, the method comprising:

rendering a three-dimensional virtual scene only once to obtain a scene background rendering map;

rendering a first foreground target reported by a first terminal associated with a first client to obtain a first foreground target rendering map;

blending the scene background rendering map and the first foreground target rendering map to obtain a first picture, the first picture comprising the first foreground target displayed in the three-dimensional virtual scene;

rendering a third foreground target transmitted by a third terminal associated with a third client to obtain a third foreground target rendering map;

blending the scene background rendering map, the third foreground target rendering map, and the first foreground target rendering map to obtain a third picture including the first foreground target and the third foreground target; and providing the third picture to the first terminal associated with the first client for displaying the third picture.

2. The method according to claim 1, wherein the blending the scene background rendering map and the first foreground target rendering map to obtain a first picture comprises:

blending the scene background rendering map and the first foreground target rendering map according to scene depth information of the three-dimensional virtual scene and first depth information of the first foreground target relative to a first camera to obtain the first picture.

3. The method according to claim 2, wherein the blending the scene background rendering map of the three-dimensional virtual scene and the first foreground target rendering map of the first foreground target according to scene depth information of the three-dimensional virtual scene and first depth information of the first foreground target relative to a first camera to obtain the first picture comprises:

obtaining a first scene background color of each pixel point in the first picture according to the scene depth information, the first depth information, and the scene background rendering map;

obtaining a first foreground target color of each pixel point in the first picture according to the scene depth information, the first depth information, and the first foreground target rendering map; and calculating a sum of the first scene background color and the first foreground target color of each pixel point in the first picture to obtain the first picture.

4. The method according to claim 1, wherein the method further comprises:

rendering a second foreground target reported by a second terminal associated with a second client to obtain a second foreground target rendering map;

blending the scene background rendering map and the second foreground target rendering map to obtain a second picture, the second picture comprising the second foreground target displayed in the three-dimensional virtual scene; and providing the second picture to the second terminal associated with the second client for displaying the second picture, wherein the first and second foreground targets in the first picture and the second picture are different while the scene background in the first picture and the second picture remains the same.

5. The method according to claim 4, wherein the first picture and the second picture are generated separately such that the first picture does not include the second foreground target and the second picture does not include the first foreground target.

6. The method according to claim 4, wherein the method further comprises:

blending the scene background rendering map, the second foreground target rendering map, and the first foreground target rendering map to obtain first an updated second picture including the first foreground target and the second foreground target; and providing the updated second picture to the second terminal associated with the second client for displaying the updated second picture.

7. The method according to claim 4, wherein the method further comprises:

blending the scene background rendering map, the third foreground target rendering map, the second foreground target rendering map, and the first foreground target rendering map to obtain an updated third picture including the first foreground target, the second foreground target and the foreground target; and providing the updated third picture to the third first terminal associated with the first client for displaying the updated third picture.

8. A computer device, comprising: a processor and a memory, the memory storing at least one instruction, and the at least one instruction being loaded and executed by the processor and causing the computer device to perform a picture generation method including:

rendering a three-dimensional virtual scene only once to obtain a scene background rendering map;

rendering a first foreground target reported by a first terminal associated with a first client to obtain a first foreground target rendering map;

blending the scene background rendering map and the first foreground target rendering map to obtain a first picture, the first picture comprising the first foreground target displayed in the three-dimensional virtual scene;

rendering a third foreground target transmitted by a third terminal associated with a third client to obtain a third foreground target rendering map;

blending the scene background rendering map, the third foreground target rendering map, and the first foreground target rendering map to obtain a third picture including the first foreground target and the third foreground target; and providing the third picture to the first terminal associated with the first client for displaying the third picture.

9. The computer device according to claim 8, wherein the blending the scene background rendering map and the first foreground target rendering map to obtain a first picture comprises:

blending the scene background rendering map and the first foreground target rendering map according to scene depth information of the three-dimensional virtual scene and first depth information of the first foreground target relative to a first camera to obtain the first picture.

10. The computer device according to claim 9, wherein the blending the scene background rendering map of the three-dimensional virtual scene and the first foreground target rendering map of the first foreground target according to scene depth information of the three-dimensional virtual scene and first depth information of the first foreground target relative to a first camera to obtain the first picture comprises:

obtaining a first scene background color of each pixel point in the first picture according to the scene depth information, the first depth information, and the scene background rendering map;

obtaining a first foreground target color of each pixel point in the first picture according to the scene depth information, the first depth information, and the first foreground target rendering map; and calculating a sum of the first scene background color and the first foreground target color of each pixel point in the first picture to obtain the first picture.

11. The computer device according to claim 8, wherein the method further comprises:

rendering a second foreground target reported by a second terminal associated with a second client to obtain a second foreground target rendering map;

blending the scene background rendering map and the second foreground target rendering map to obtain a second picture, the second picture comprising the second foreground target displayed in the three-dimensional virtual scene; and providing the second picture to the second terminal associated with the second client for displaying the second picture, wherein the first and second foreground targets in the first picture and the second picture are different while the scene background in the first picture and the second picture remains the same.

12. The computer device according to claim 11, wherein the first picture and the second picture are generated separately such that the first picture does not include the second foreground target and the second picture does not include the first foreground target.

13. The computer device according to claim 11, wherein the method further comprises:

blending the scene background rendering map, the second foreground target rendering map, and the first foreground target rendering map to obtain an updated second picture including the first foreground target and the second foreground target; and providing the updated second picture to the second terminal associated with the second client for displaying the updated second picture.

14. The computer device according to claim 11, wherein the method further comprises:

blending the scene background rendering map, the third foreground target rendering map, the second foreground target rendering map, and the first foreground target rendering map to obtain an updated third picture including the first foreground target, the second foreground target and the foreground target; and providing the updated third picture to the third first terminal associated with the first client for displaying the updated first picture.

15. A non-transitory computer-readable storage medium, storing at least one program code, and the program code being loaded and executed by a processor of a computer device and causing the computer device to perform a picture generation method including:

rendering a three-dimensional virtual scene only once to obtain a scene background rendering map;

rendering a first foreground target reported by a first terminal associated with a first client to obtain a first foreground target rendering map;

blending the scene background rendering map and the first foreground target rendering map to obtain a first picture, the first picture comprising the first foreground target displayed in the three-dimensional virtual scene;

rendering a third foreground target transmitted by a third terminal associated with a third client to obtain a third foreground target rendering map;

blending the scene background rendering map, the third foreground target rendering map, and the first foreground target rendering map to obtain a third picture including the first foreground target and the third foreground target; and providing the third picture to the first terminal associated with the first client for displaying the third picture.

16. The non-transitory computer-readable storage medium according to claim 15, wherein the blending the scene background rendering map and the first foreground target rendering map to obtain a first picture comprises:

blending the scene background rendering map and the first foreground target rendering map according to scene depth information of the three-dimensional virtual scene and first depth information of the first foreground target relative to a first camera to obtain the first picture.

17. The non-transitory computer-readable storage medium according to claim 16, wherein the blending the scene background rendering map of the three-dimensional virtual scene and the first foreground target rendering map of the first foreground target according to scene depth information of the three-dimensional virtual scene and first depth information of the first foreground target relative to a first camera to obtain the first picture comprises:

obtaining a first scene background color of each pixel point in the first picture according to the scene depth information, the first depth information, and the scene background rendering map;

obtaining a first foreground target color of each pixel point in the first picture according to the scene depth information, the first depth information, and the first foreground target rendering map; and calculating a sum of the first scene background color and the first foreground target color of each pixel point in the first picture to obtain the first picture.

18. The non-transitory computer-readable storage medium according to claim 15, wherein the method further comprises:

rendering a second foreground target reported by a second terminal associated with a second client to obtain a second foreground target rendering map;

blending the scene background rendering map and the second foreground target rendering map to obtain a second picture, the second picture comprising the second foreground target displayed in the three-dimensional virtual scene; and providing the second picture to the second terminal associated with the second client for displaying the second picture, wherein the first and second foreground targets in the first picture and the second picture are different while the scene background in the first picture and the second picture remains the same.

19. The non-transitory computer-readable storage medium according to claim 18, wherein the first picture and the second picture are generated separately such that the first picture does not include the second foreground target and the second picture does not include the first foreground target.

20. The computer device according to claim 8, wherein the method further comprises:

providing the third picture to the third terminal associated with the third client for displaying the third picture.

* * * * *